US012113259B2

(12) United States Patent
Chattopadhyay et al.

(10) Patent No.: US 12,113,259 B2
(45) Date of Patent: Oct. 8, 2024

(54) TERAHERTZ WAVEGUIDE SWITCHES

(71) Applicant: California Institute of Technology, Pasadena, CA (US)

(72) Inventors: Goutam Chattopadhyay, Pasadena, CA (US); Robert H. Lin, Chino, CA (US); Sven L. Van Berkel, Pasadena, CA (US); Sofia Rahiminejad, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 113 days.

(21) Appl. No.: 17/845,762

(22) Filed: Jun. 21, 2022

(65) Prior Publication Data

US 2023/0027356 A1  Jan. 26, 2023

Related U.S. Application Data

(60) Provisional application No. 63/213,122, filed on Jun. 21, 2021.

(51) Int. Cl.
*G02B 6/35* (2006.01)
*H01P 1/02* (2006.01)
*H01P 1/12* (2006.01)

(52) U.S. Cl.
CPC ............ *H01P 1/122* (2013.01); *G02B 6/3578* (2013.01); *H01P 1/02* (2013.01)

(58) Field of Classification Search
None
See application file for complete search history.

(56) References Cited

U.S. PATENT DOCUMENTS

| | | |
|---|---|---|
| 11,349,183 B2 | 5/2022 | Rahiminejad et al. |
| 2020/0381793 A1* | 12/2020 | Rahiminejad ........... H01P 11/00 |
| 2021/0013569 A1 | 1/2021 | Rahiminejad et al. |

OTHER PUBLICATIONS

Rahiminejad, S., et al., "A MEMS Contactless Rotating Terahertz Waveguide Switch", 2022 IEEE 35th International Conference on Micro Electro Mechanical Systems Conference (MEMS), Jan. 2022, pp. 1-4. Ref. [28] of third embodiment.
Q-521 Q-Motion® Miniature Linear Stage, https://www.physikinstrumente.com/en/products/linear-stages/miniature-linear-stages/q-521-q-motion-miniature-linear-stage-103151/#downloads, pp. 1-8, as downloaded Jun. 21, 2022. Reference [16] of first embodiment.
Q-521 Q-Motion® Miniature Linear Stage, https://www.physikinstrumente.com/en/products/linear-stages/miniature-linear-stages/q-521-q-motion-miniature-linear-stage-103151/, pp. 1-6, as downloaded Jun. 21, 2022. Reference [16] of first embodiment.
Q-Motion® Miniature Linear Stage—Smallest Linear Stage with Position Control, High Resolution and Affordable Price, pp. 1-6, Jun. 24, 2020. Reference [16] of first embodiment.

(Continued)

*Primary Examiner* — Chad H Smith
(74) *Attorney, Agent, or Firm* — Gates & Cooper LLP

(57) ABSTRACT

Low-loss terahertz switches with nanometer resolution positioning and feedback are disclosed. In one embodiment, the switch uses a U-bend waveguide surrounded by an electromagnetic band gap and is implemented in a fully metal-machined fashion in combination with a piezo-electric motor and an optical linear encoder. In another embodiment, the switch comprises a MEMS device.

21 Claims, 23 Drawing Sheets

(56) References Cited

OTHER PUBLICATIONS

Q-Motion® Positioners, MP139EK 4.2.0 Dec. 2019. 0.3, pp. 1-4. Reference [16] of first embodiment.
Dicke, R.H., "The Measurement of Thermal Radiation at Microwave Frequencies", The Review of Scientific Instruments, Jul. 1946, pp. 268-275, vol. 17, No. 7.
Sobolewsk, J., et al., "State of the Art Sub-Terahertz Switching Solutions", IEEE Access, 2022, pp. 12983-12999, vol. 10.
Reck, T., et al., "A 700-GHz MEMS Waveguide Switch", IEEE Transactions on Terahertz Science and Technology, Jul. 2016, pp. 641-643, vol. 6, No. 4.
"W-Band Reflective SPDT PIN Diode Switch", https://www.eravant.com/75-to-110-ghz-30-db-isolation-wr-10-waveguide-w-band-reflective-spdt-pin-diode-switch, as downloaded Oct. 21, 2022, pp. 1-5.
Shah, U., et al., "A 500-750 GHz RF MEMS Waveguide Switch", IEEE Transactions on Terahertz Science and Technology, 2017, pp. 326-334, vol. 7, No. 3.
Kildal, P-S., Definition of Artificially Soft and Hard Surfaces for Electromagnetic Waves, Electronics Letters, Mar. 1988, pp. 168-170, vol. 24, No. 3.
Sievenpiper, D., et al., "High-Impedance Electromagnetic Surfaces with a Forbidden Frequency Band", IEEE Transactions on Microwave Theory and Techniques, Nov. 1999, pp. 2059-2074, vol. 47, No. 11.
Kildal, P-S., et al., "Local Metamaterial-Based Waveguides in Gaps Between Parallel Metal Plates", IEEE Antennas and Wireless Propagation Letters, 2009, pp. 84-87, vol. 8.
Rajo-Iglesias, E., et al., "Numerical studies of bandwidth of parallel plate cut-off realized by bed of nails, corrugations and mushroom-type EBG for use in gap waveguides", IET Microwaves, Antennas & Propagation, 2011, pp. 282-289, vol. 5, No. 3.
Siegel, P.H., "Terahertz Technology", IEEE Transactions on Microwave Theory and Techniques, Mar. 2002, pp. 910-928, vol. 50, No. 3.
Cooper, K.B., et al., "Submillimeter-Wave Radar", IEEE Microwave Magazine, Nov./Dec. 2014, pp. 51-67, vol. 15, No. 7.
Gulkis, S., et al., "Microwave Instrument for the Rosetta Orbiter (MIRO)", Space Science Reviews, Feb. 2007, pp. 561-597, vol. 128, Nos. 1-4.
Larson, L.E., et al., "Micromachined microwave actuator (MIMAC) technology—a new tuning approach for microwave Integrated circuits", IEEE 1991 Microwave and Millimeter-Wave Monolithic Circuits Symposium, Jun. 1991, pp. 27-30.
Lee, H-C, et al., "Piezoelectrically Actuated RF MEMS DC Contact Switches With Low Voltage Operation", IEEE Microwave and Wireless Components Letters, Apr. 2005, pp. 202-204, vol. 15, No. 4.
Tang, M., "A Low-Loss Single-Pole-Double-Throw (SPDT) Switch Circuit", Conference Paper, Jul. 2007, pp. 675-678.
Zareie, H., et al., "Compact High-Power SPST and SP4T RF MEMS Metal-Contact Switches", IEEE Transactions on Microwave Theory and Techniques, Feb. 2014, pp. 297-305, vol. 62, No. 2.
Ilkhechi, A.K., et al., "A new electrostatically actuated rotary three-state DC-contact RF MEMS switch for antenna switch applications", Microsyst Technol, Jan. 2017, pp. 231-243, vol. 23.
Rebeiz, G.M., et al., "RF MEMS switches and switch circuits", IEEE Microwave Magazine, Dec. 2001, pp. 59-71, vol. 2, No. 4.
Seki, T., et al., "Development of a large-force low-loss metal-contact RF MEMS switch", Sensors and Actuators A, 2006, pp. 683-688, vol. 132, No. 2.
Uno, Y., et al., "Development of SPDT-Structured RF MEMS Switch", , International Conference on Solid-State Sensors, Actuators and Microsystems (Transducers), Jun. 2009, pp. 541-544.
Daneshman, M., et al., "RF MEMS Waveguide Switch", IEEE Transactions on Microwave Theory and Techniques, Dec. 2004, pp. 2651-2657, vol. 52, No. 12.
Baghchehsaraei, Z., et al., "MEMS reconfigurable millimeter-wave surface for V-band rectangular-waveguide switch", International Journal of Microwave and Wireless Technologies, 2013, pp. 341-349, vol. 5, No. 3.
Vahabisani, N., et al., "Monolithic Millimeter-Wave MEMS Waveguide Switch", IEEE Transactions on Microwave Theory and Techniques, Feb. 2015, pp. 340-251, vol. 63, No. 2.
Shah, U., et al., "500-750 GHz Submillimeter-Wave MEMS Waveguide Switch", IEEE MTT-S International Microwave Symposium (IMS), May 2016, pp. 1-4.
Amin, T.M.F., et al., "A virtual pivot point MEMS rotary comb actuator for tunable laser applications", Proceedings of SPIE—The International Society for Optical Engineering, Oct. 2012, pp. 84900D-1-84900D-9, vol. 8490.
Briere, J., et al., "Rotating Circular Micro-Platform with Integrated Waveguides and Latching Arm for Reconfigurable Integrated Optics", Micromachines, Dec. 2017, pp. 1-19, vol. 8, No. 354.
Yablonovitch, E., "Inhibited Spontaneous Emission in Solid-State Physics and Electronics", Physical Review Letters, May 1987, pp. 2059-2062, vol. 58, No. 20.
Kildal, P-S., "Three Metamaterial-based Gap Waveguides between Parallel Metal Plates for mm/submm Waves", 3rd European Conference on Antennas and Propagation (EuCAP), Mar. 2009, pp. 28-32.
Tayebpour, J., et al., "A Waveguide Switch Based on Contactless Gap Waveguide Technology", IEEE Microwave and Wireless Components Letters, Dec. 2019, pp. 771-774, vol. 29, No. 12.
Yeh, J.A., et al., "Large rotation actuated by in-plane rotary comb-drives with serpentine spring suspension", Journal of Micromechanics and Microengineering, 2005, pp. 201-206, vol. 15.
COMSOL Multiphysics® v. 5.5, Press Release, www.comsol.com. Comsol AB, Stockholm, Sweden, pp. 1-10.
"Ansys 2019 R2 Strengthens Digital Thread Between Design, Engineering and Manufacturing", ANSYS® Electromagnetics Suite, Release 2019 R2, Help System, Electronics Desktop, ANSYS, Inc., pp. 1-7.
King, R.J., et al., "The Synthesis of Surface Reactance Using an Artificial Dielectric", IEEE Transactions on Antennas and Propagation, May 1983, pp. 471-476, vol. AP-31, No. 3.
Uzunkol, M., et al., "140-220 GHz SPST and SPDT Switches in 45 nm CMOS SOI", IEEE Microwave and Wireless Components Letters, Aug. 2012, pp. 412-414, vol. 22, No. 8.
Meng, F., et al., "Monolithic Sub-Terahertz SPDT Switches With Low Insertion Loss and Enhanced Isolation", IEEE Transactions on Terahertz Science and Technology, Mar. 2018, pp. 192-200, vol. 8, No. 2.
Cheon, C.D., et al., A New Wideband, Low Insertion Loss, High Linearity SiGe RF Switch, IEEE Microwave and Wireless Components Letters, Oct. 2020, pp. 985-988, vol. 30, No. 10.
Wipf, S.T., et al., "D-Band RF-MEMS SPDT Switch in a 0.13 μm SiGe BiCMOS Technology", IEEE Microwave and Wireless Components Letters, Dec. 2016, pp. 1002-1004, vol. 26, No. 12.

* cited by examiner

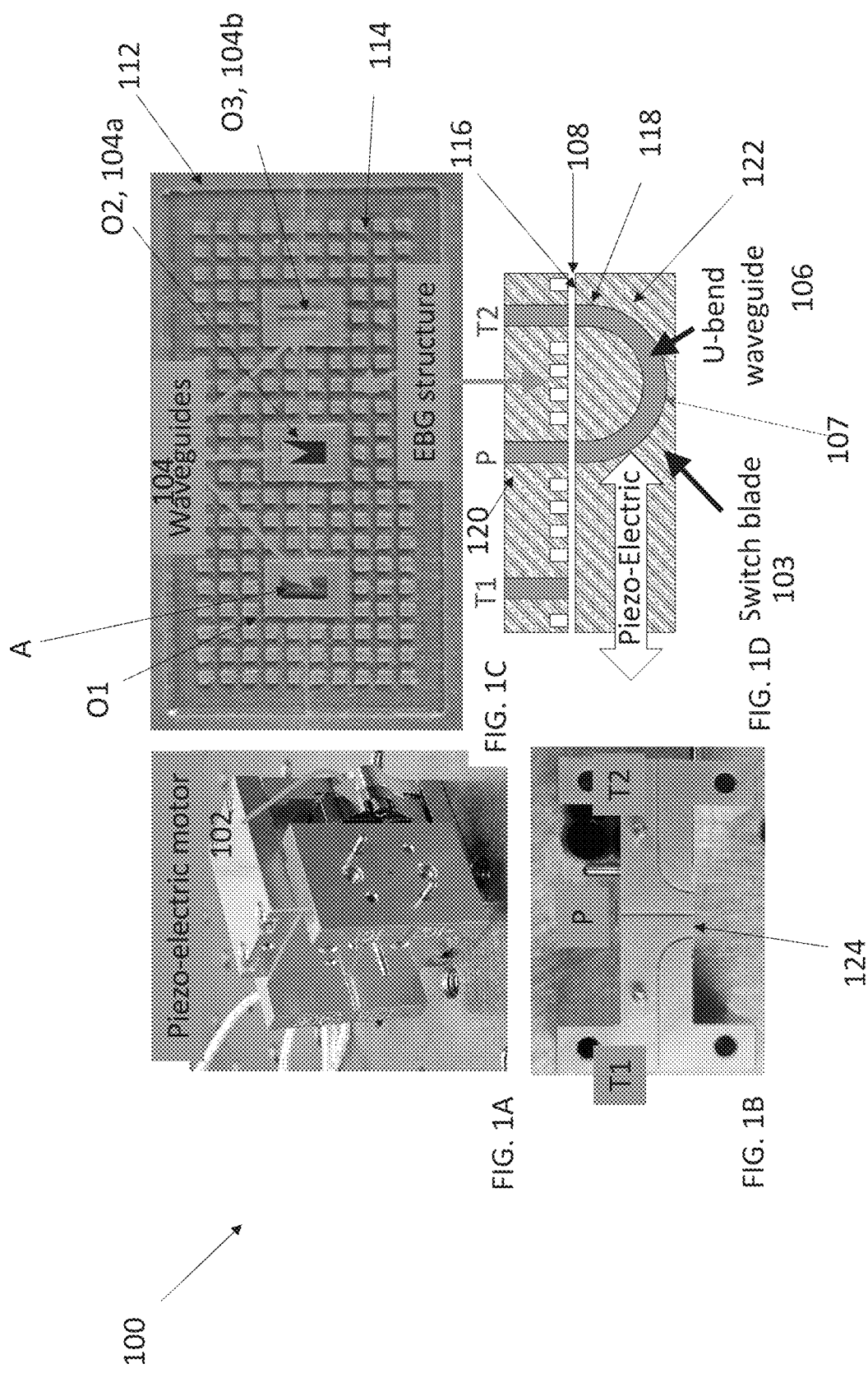

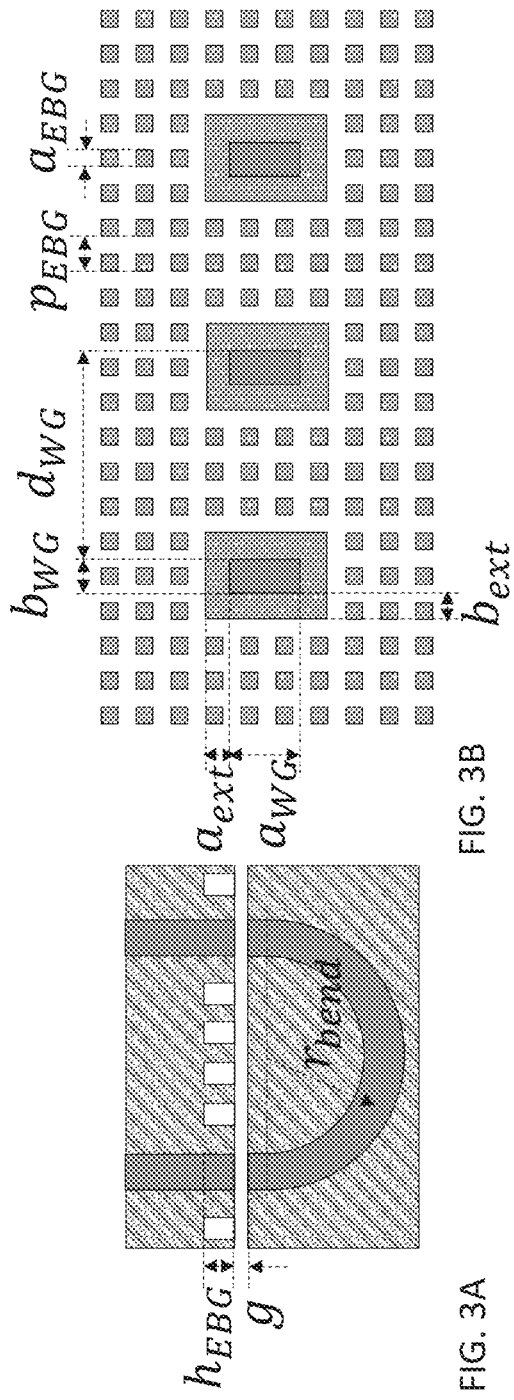
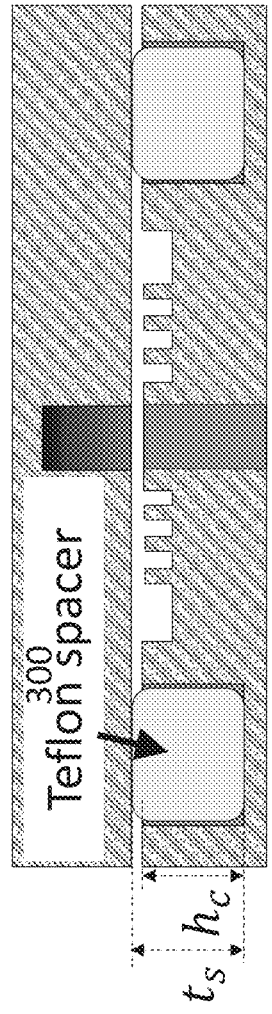
FIG. 3A
FIG. 3B
FIG. 3C

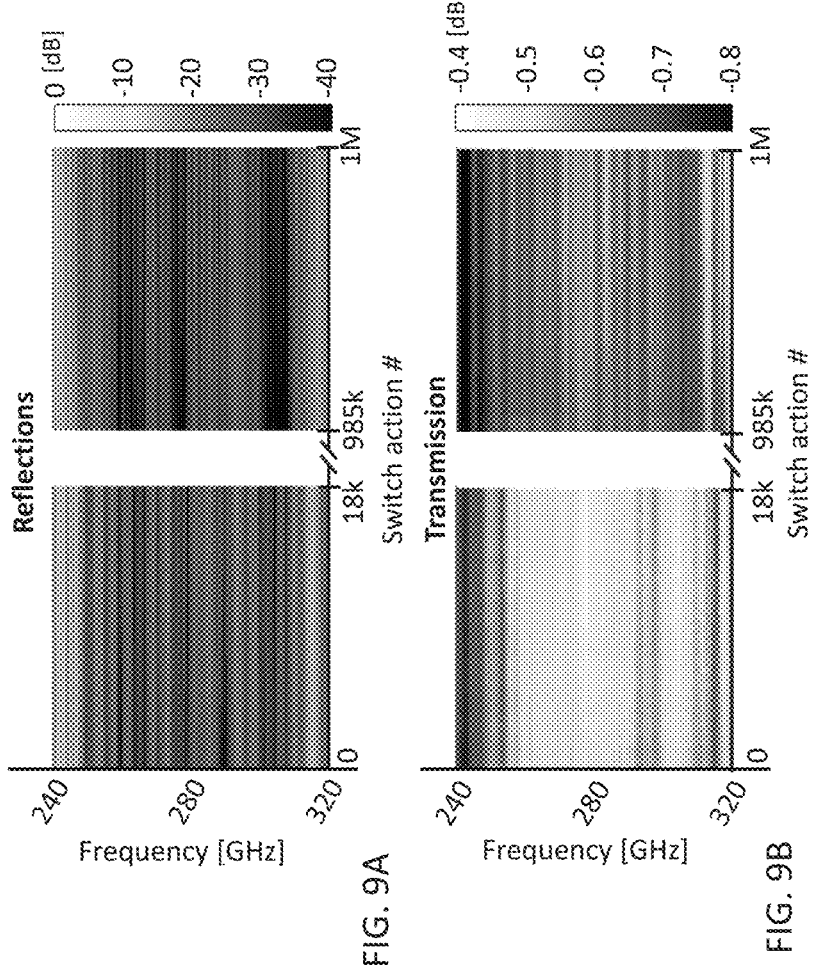

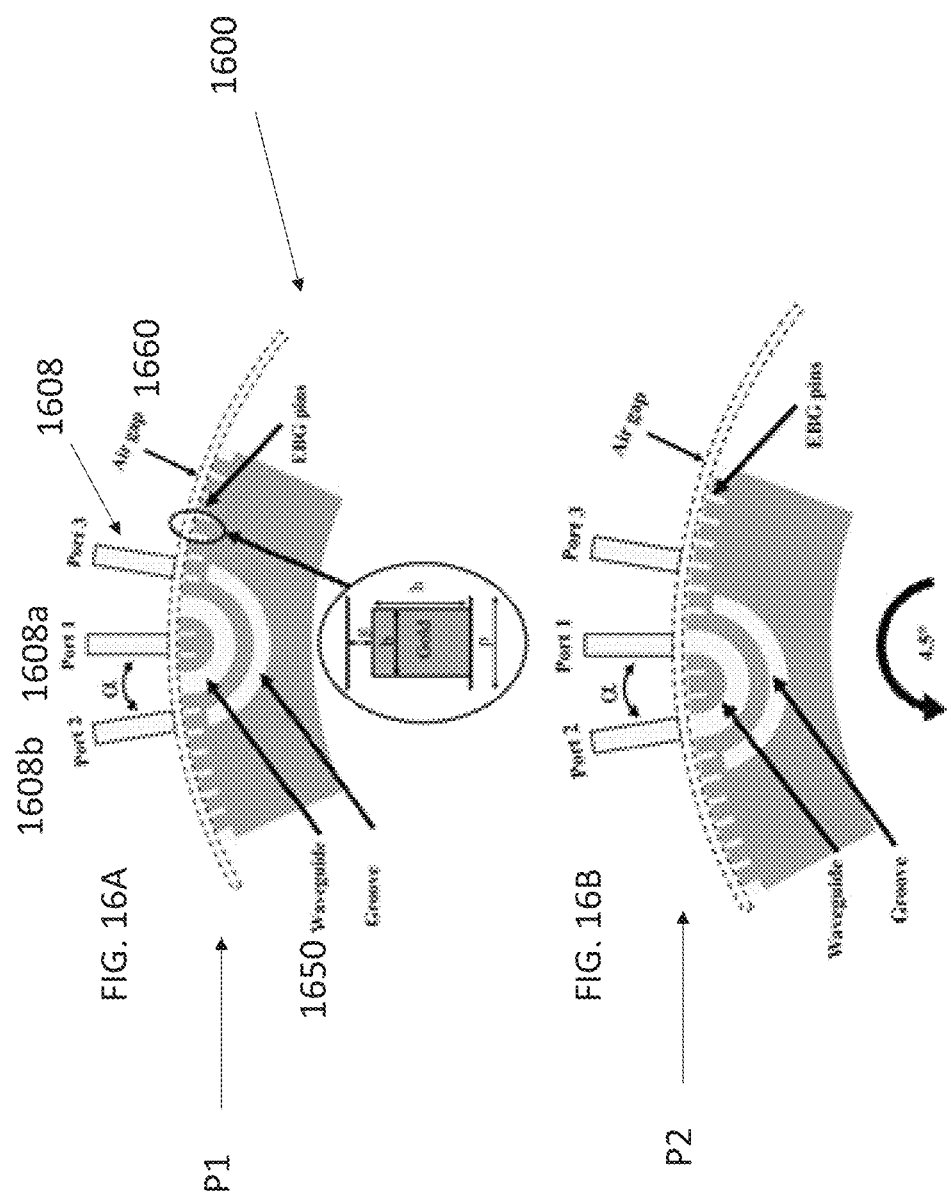

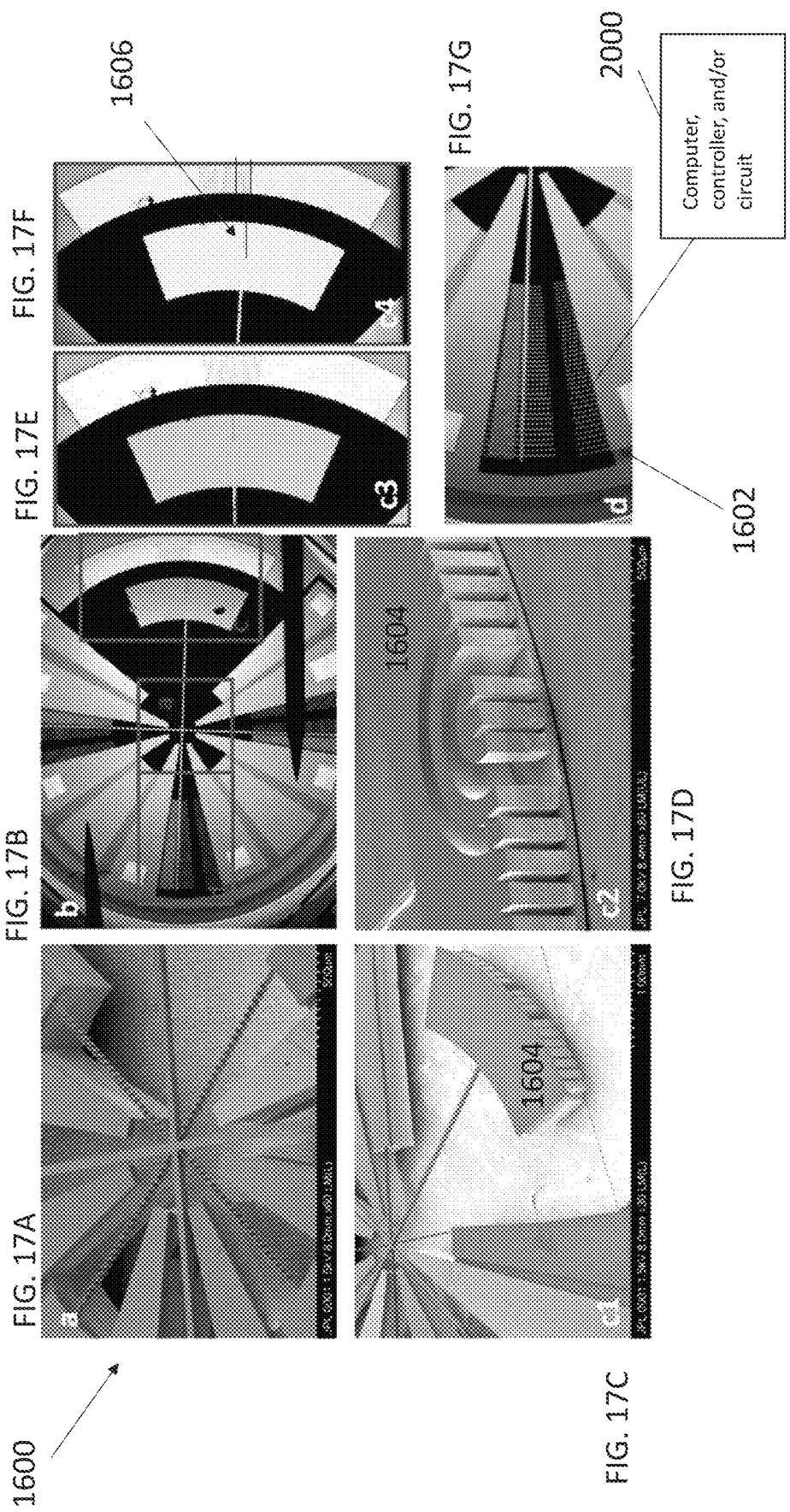

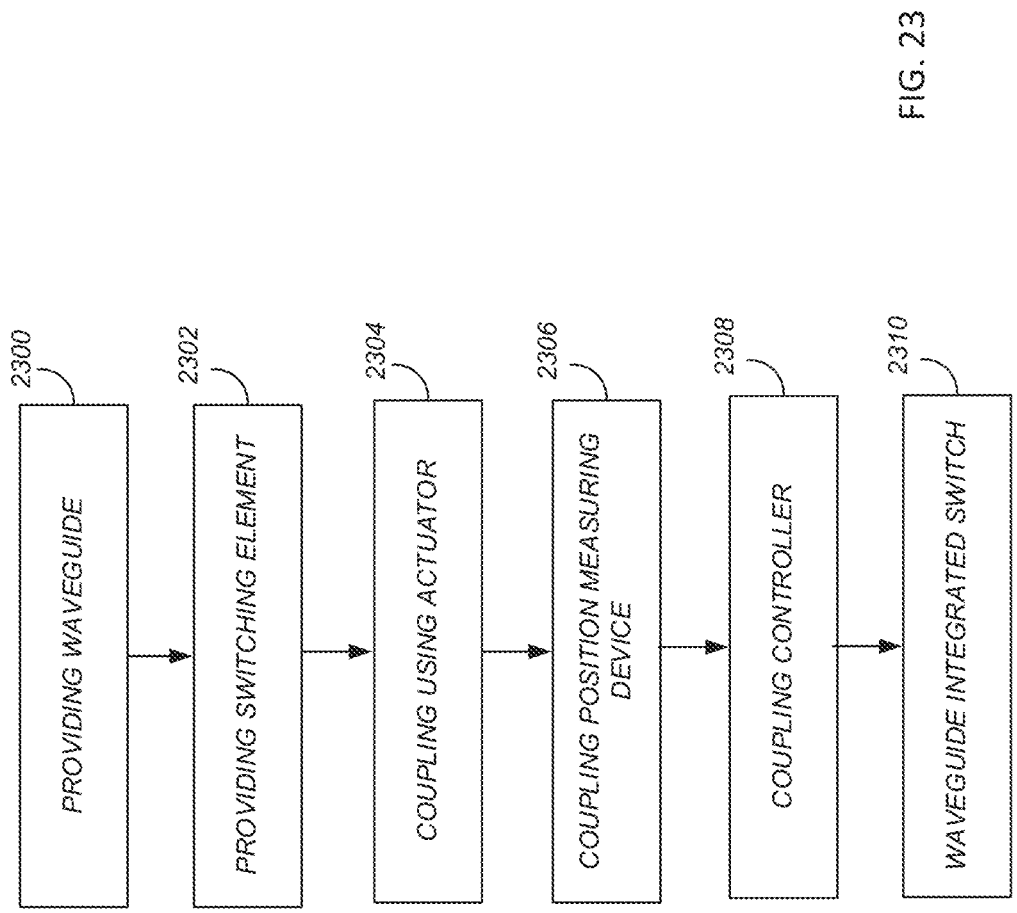

TERAHERTZ WAVEGUIDE SWITCHES

CROSS REFERENCE TO RELATED APPLICATIONS

This application claims the benefit under 35 U.S.C. Section 119(e) of commonly-assigned U.S. provisional patent application Ser. No. 63/213,122 filed on Jun. 21, 2021, by Goutam Chattopadhyay, Robert H. Lin, and Sven L. Van Berkel, entitled "TERAHERTZ WAVEGUIDE SWITCHES USING PIEZO ELECTRIC MOTORS," client reference CIT-8665-P, which application is incorporated by reference herein.

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

This invention relates to low loss sub-millimeter wave switches and methods of making the same.

2. Description of the Related Art

Remote-sensing systems utilize a calibration in order to obtain high-fidelity data. Typical microwave measurement systems use a Dicke-switch type of calibration where a low-loss switch connects the receiving system alternatingly to the antenna and a load that generates a precisely known amount of Johnson noise power [1]. Such single-pole dual-throw (SPDT) switches also find application in transceivers or dual-band systems. At microwave and millimeter-wave (mm-wave) frequencies, low-loss SPDT switches are readily available [2]. Typical switching solutions are transistor-, diode- and Microelectromechanical systems (MEMS)-based using integrated circuit (IC) technologies [3]-[6], or waveguide integrated PIN diodes [7].

At sub-mm-wave frequencies, spectrometers and radiometers measuring molecular absorption and rotational lines for earth and planetary science utilize a high-precision calibration mechanism. Due to the non-availability of low-loss switches at sub-mm wave frequencies, bulky and power-hungry motors with flip mirrors are typically used to perform the function of the low-loss switch by re-pointing the antenna to the cold sky.

A waveguide integrated solution for RF front-end components is preferred due to its the low insertion loss, high power handling capabilities and a degraded IC-technology performance. RF-MEMS waveguide-based single-pole single-throw (SPST, ON/OFF) switches, fabricated using silicon micro-machining techniques, have been developed as a preliminary step towards SPDT switching [8], [9]. In [9], the 500 GHz-750 GHz switch used a MEMS reconfigurable surface whereas the switch presented in [8] used a MEMS controlled septum. All of these MEMS waveguide switches require relatively high power for actuation and mechanical and electrical contact between waveguide walls to switch between states, thus increasing the risk of stiction and failure.

What is needed then, are more reliable, low power, and robust switches for terahertz devices. The present disclosure satisfies this need.

SUMMARY OF THE INVENTION

Embodiments of the inventive subject matter disclosed herein include, but are not limited to, the following.

1. A waveguide integrated switch, comprising:
   an actuator comprising a switching body coupled to one or more waveguides, the actuator actuating the switching body to open or close transmission of an electromagnetic wave to the one or more waveguides and the waveguide configured and dimensioned to guide the electromagnetic wave having a frequency in a range of 100 gigahertz (GHz) to 1000 terahertz (THz); and
   wherein the actuator is configured to position the switching body relative to the waveguides 104 with an accuracy/precision in a range of 1-10 nanometers or 1 nm-100 microns.

2. The switch of example 1, further comprising a position measuring device coupled to the switching body, the position measuring device measuring the position of the switching body relative to the waveguide with nanometer resolution.

3. The switch of example 1, wherein the actuator comprises a piezoelectric motor.

4. The switch of example 2, wherein the position measuring device comprises an optical linear encoder optically coupled to the switching body or a stage of the motor physically attached to the switching body.

5. The switch of example 1, wherein the actuator comprises a Microelectromechanical system (MEMS) device including the switching body and the position measuring device comprises a scale or ruler having nanometer scale graduations on the switching body.

6. The switch of example 2, further comprising a circuit coupled to the actuator, the circuit applying a voltage controlling a position of the switching body using a feedback comprising a measurement of the position relative to a target position obtained using the position measuring device.

7. The switch of example 6, wherein the circuit comprises a feedback circuit comprising a feedback loop obtaining the measurement.

8. The switch of example 1, further comprising:
   the switching body comprising a metal switching element;
   the actuator comprising a piezoelectric motor coupled to the switching element;
   a circuit coupled to the piezoelectric motor, the piezoelectric motor moving a position of the switching element between a first position and a second position in response to one or more voltage signals applied by the circuit to the piezoelectric motor, wherein:
   the first position couples the switching element to at least one of the waveguides comprising a first waveguide or a second waveguide,
   the second position de-couples the switching element from the at least one of the first waveguide or the second waveguide; and wherein:
   the first waveguide and the second waveguide are configured and dimensioned to guide an electromagnetic wave comprising having a frequency in a range of 100 gigahertz (GHz) to 1000 terahertz (THz).

9. The switch of example 8, further comprising:
   a feedback circuit providing feedback to the circuit, the feedback comprising at least one of:
   an error in the position, or
   the position, comprising a measured position, with respect to a target position.

10. The switch of example 9, further comprising an optical linear encoder optically coupled to the switching element for measuring the measured position.

11. The switch of example 8, wherein:
the switching element comprises a curved connector waveguide configured and dimensioned to guide the electromagnetic wave, the curved connector waveguide having an input and an output; and
the piezoelectric motor moves the input and the output along a linear direction between:
the first position, coupling the input to the first waveguide via a gap and the output to the second waveguide via the gap, so that the electromagnetic wave is transmitted from the first waveguide to the second waveguide via the connector waveguide, and
the second position, de-coupling the input from the first waveguide and the output from the second waveguide.

11. The switch of example 11, wherein the connector waveguide comprises a U-shaped waveguide.

12. The switch of example 11, further comprising:
a metal waveguide block comprising the first waveguide and the second waveguide, the metal waveguide block having a first metal surface comprising an electromagnetic bandgap surface surrounding a first opening spaced from a second opening along the linear direction, wherein:
the first opening comprises a first input to, or a first output from, the first waveguide; and
the second opening comprises a second input to, or a second output from, the second waveguide;
the metal switching element comprising a metal piece comprising a second metal surface including the input separated from the output along the linear direction;
an electrically insulating spacer spacing the first metal surface from the second metal surface so as to fix the gap, comprising an electrically insulating gap of less than 60 microns between the first metal surface and the second metal surface, at:
the first position, wherein, in a first direction of the gap, the first opening is aligned with the input and the second opening is aligned with the output, and
the second position, wherein, in the first direction, the input is mis-aligned with the first opening the output is misaligned with the second opening;
alignment pins fixing a third position of the metal switching element relative to the metal waveguide block, the third position in a second direction perpendicular to the linear direction between the first position and the second position; and
fixing pins securing the metal switching element to the piezoelectric motor.

13. The switch of example 12, wherein the first position and the second position are positionable with 1 nanometer resolution.

14. A device comprising the switch of example 1, further comprising an antenna and a calibration waveguide coupled to a receiver via the switch, wherein the calibration waveguide comprises or is coupled to the first waveguide (or the second waveguide) the antenna is coupled to the second waveguide (or the first waveguide).

15. A transceiver, receiver, transmitter, or spectrometer comprising the switch of example 1.

16. The switch of example 1, wherein the waveguides comprise rectangular waveguides having a cross sectional area in a range of 100-5000 microns by 100-5000 microns and the connector waveguide has a length in a range of 5-10 mm.

17. The switch of example 1, wherein:
the switching element comprises a curved connector waveguide configured and dimensioned to guide the electromagnetic wave, the curved connector waveguide having an input and an output; and
the actuator moves the input and the output along a direction between:
a first position, coupling the input to the first waveguide via a gap and the output to the second waveguide via the gap, so that the electromagnetic wave is transmitted from the first waveguide to the second waveguide via the connector waveguide, and
a second position, de-coupling the input from the first waveguide and the output from the second waveguide.

18. The switch of example 17, wherein actuator comprises a piezoelectric motor.

19. The switch of example 17, wherein the curved connector waveguide comprises a U-shaped waveguide.

20. A method of making a waveguide integrated switch, comprising:
coupling a switching body to one or more waveguides using an actuator, the actuator actuating the switching body to open or close transmission of an electromagnetic wave to the one or more waveguides and the one or more waveguides each configured and dimensioned to guide the electromagnetic wave having a frequency in a range of 100 gigahertz (GHz) to 1000 terahertz (THz); and
wherein the actuator is configured to position the switching body relative to the waveguides with an accuracy in a range of 1-10 nanometers.

In one embodiment, the switch comprises a sub-THz SPDT waveguide switch, operating from 250 GHz to 310 GHz. The piezo-electric controlled switch is suitable for high-fidelity calibration of THz spectroscopy and radiometry instruments, thanks to its low insertion loss, <−0.6 dB, low return loss, <−20 dB, and high solation, <−75 dB. The high isolation and low leakage is achieved by using a bed of nails surrounding the waveguide terminals, that act as an electromagnetic bandgap (EBG) structure in the proximity of the switching blade. The switching blade is controlled with micrometric precision to direct the signal through a U-bend waveguide to either one of the two output waveguide terminals. The reliability and durability of the switch is tested by performing one million switch actions at its maximum switching rate of 1 Hz, resulting in a mean positioning error better than 2 μm.

In another example, the switch comprises a Single-Pole Double-Throw (SPDT) microelectromechanical system (MEMS) waveguide switch operating at 500-750 GHz. The switch consists of a U-bend waveguide surrounded by an electromagnetic bandgap (EBG) surface. The EBG surface is used to prevent propagation of electromagnetic waves without mechanical or electrical contact. The U-bend is placed on a rotating arm, that moves between two waveguide connections. The arms movement is controlled by a rotating MEMS motor that can rotate ±4.5° at 90 V. The switch is fabricated using silicon micromachining and is designed to be in-plane with the connecting waveguides thus allowing it to be implemented into a silicon micromachined waveguide network. Since the electromagnetic wave can be isolated with the EBG surface without the need for electrical or mechanical contact, the MEMS waveguide switch rotates freely between two contactless states, circumventing common MEMS switch issues such as stiction.

BRIEF DESCRIPTION OF THE DRAWINGS

Referring now to the drawings in which like reference numbers represent corresponding parts throughout:

FIGS. 1A-1D. Piezo-electric waveguide switch. FIG. 1A illustrates a full device. FIG. 1B illustrates the split-block, showing the waveguides of the single pole (P) port and the double throw (T1 and T2) positions. FIG. 1C illustrates waveguide switching interface with EBG structure. FIG. 1D is a schematic representation of the SDPT switch.

FIG. 2A: No EBG is present. FIG. 2B: EBG is present.

FIGS. 3A-3C. Dimensions of EBG structure and waveguide terminals. FIG. 3A is a schematic side-view of the switching blade in the presence of the waveguide block. FIG. 3B is a schematic top-view of the waveguide block containing the waveguide terminals and EBG structure. FIG. 3C is a schematic side-view indicating how the switching blade and waveguide block are separated by Teflon spacers.

FIGS. 5A-5C. Different components and assembly stages of the piezo switch, wherein FIG. 5A shows waveguide routing, FIG. 5B shows switching directions, and FIG. 5C shows alignment pins and slots.

FIGS. 6A-6C. Simulated switch performance as function of a switch blade mis-alignment Δy as indicated in FIG. 5B. The gap height is g=50 μm and a conductivity of σ=4.1·10$^7$S/m is assumed, wherein FIG. 6A shows reflections, FIG. 6B shows transmission and FIG. 6C shows isolation.

FIGS. 9A-9B. Reflections (FIG. 9A) and transmission (FIG. 9B) measurements during durability cycling. The measurements are done the first 18.000 switching actions and the last 15.000 switching actions. A total of 1 million switching actions are performed.

FIG. 16A illustrates the U-bend waveguide is placed on a rotating disc in its natural state. FIG. 16B shows that when actuated, the disc rotates θ=4.5° and either connect port 1-2 or port 1-3. The surrounding pins create an EBG surface and can thus allow the wave to go from one port through the U-bend to the next port without leaking to the sides, even though there is an air gap.

FIG. 17A is a scanning electron microscope (SEM) image of the four springs attached to center of rotation. FIG. 17B is a Microscope image view of the full device seen from the top while actuated. FIG. 17C) SEM image of the waveguide section, seen from the top. FIG. 17D) SEM image of the waveguide section seen from the bottom. FIG. 17E) Microscope image of the center line and Vernier lines 1606 from the top, when no voltage is applied, 0°. FIG. 17F) Microscope image of the center line and Vernier lines from the top, when voltage is applied, 4.5°. The Vernier lines go from −5° to +5°. FIG. 17G is a microscope image close-up of the comb-drive displacement when fully actuated.

FIG. 19A-19E: Process flow for manufacturing the rotating contactless MEMS waveguide switch, wherein FIG. 19A shows structure, FIG. 19B shows the back side of the wafer is patterned and etched 5 μm to define the spacers that allow for free rotation of the switch, FIG. 19C shows the front side of the wafer is patterned and etched using a deep reactive ion etch (DRIE) process, FIG. 19D shows the back side of the wafer is also patterned and etched using a silicon DRIE process, and FIG. 19E shows the BOX layer is removed from the back using dry etching and the key parts are sputtered with Ti/Au to make electrical contacts for the application of an actuation voltage.

FIG. 23 is a flowchart illustrating a method of making a waveguide integrated switch.

DETAILED DESCRIPTION OF THE INVENTION

Figures 2A, 2B:
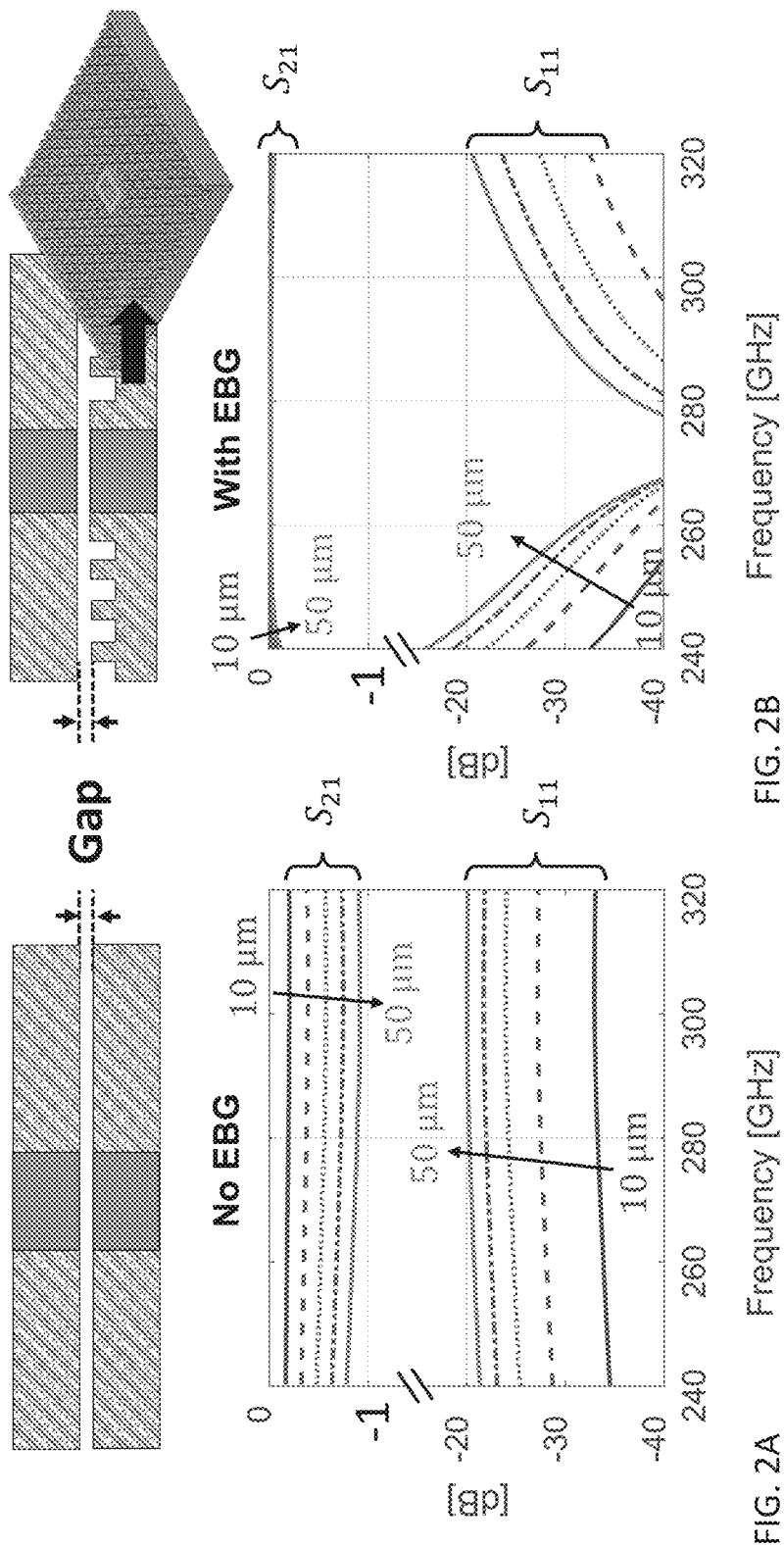
FIGS. 2A-2B. Simulated transmission and reflection for a single waveguide, embedded in two PEC blocks separated by a gap as indicated in the top of the figure. The simulated gaps are g=10, 20, 30, 40, 50 μm

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description FIGS. 1-17 illustrate example implementations of a waveguide integrated switch 100, 1200, 1600 comprising an actuator 102, 1202, 1602 comprising a switching body 103, 1203, 1604 coupled to one or more waveguides 104, 1204, 1608. The actuator 102, 1602 actuates the switching body 103, 1604 to open or close transmission of an electromagnetic wave 107 to the one or more waveguides. Each of the waveguides 1608, 104, 1204 are configured and dimensioned to guide the electromagnetic wave having a frequency in a range of 100 gigahertz (GHz) to 1000 terahertz (THz). In one or more examples, the switch can position the switching body relative to the waveguides with nanometer accuracy (or with an accuracy in a range of 1-10 nanometers or 1 nm-1000 microns). In one or more examples, a position measuring device 1606, 1210, 150 is coupled to the switching body 103, 1203, 1604 or a stage moving the switching body, for measuring a position of the switching body relative to the waveguide with nanometer or micrometer resolution/accuracy/precision. Example actuators include, but are not limited to, a piezoelectric motor or a MEMS motor [10], as discussed in the following examples (first embodiment, second embodiment, and third embodiment).

First Embodiment Comprising Position Feedback and Piezoelectric Motor Drive Device Structure FIGS. 1A-1D illustrate a waveguide integrated switch according to a first example, wherein an input waveguide (i.e. single pole P comprising opening O1) is switchably connected to one of the two output waveguides (dual throw T1 and T2 comprising openings O2 and O3) via a piezoelectric controlled switching blade, element, or body 102 that contains a connector waveguide (U-bend waveguide 106) to direct the signal to the desired port. A gap 108 between the switching blade and the waveguide block 112 ensures no metal-on-metal contact between the switching blade and switch block to minimize friction. The U-bend waveguide comprises an input 110 (e.g., opening) and an output 112 (e.g., opening) that can be positioned by the motor for coupling terminals P, T1, and T2.

In the example shown, the metal waveguide block 112 comprises at least a first waveguide 104, 104a and a second waveguide 104, 104b and the metal waveguide block has a first metal surface 114 comprising an electromagnetic bandgap surface surrounding a first opening O1 spaced from a second opening O1 along a linear switching direction. The first opening comprises a first terminal T2 (first input to, or a first output from) the first waveguide; and the second opening O2 comprises a second terminal P (second input to, or a second output from) the second waveguide 104.

The metal switching element 103 comprises a metal piece comprising a second metal surface 116 including an input 118 to the connector waveguide separated (along the linear switching direction) from an output 120 from the connector waveguide.

The actuator 102 comprising the piezoelectric motor moves the connector waveguide 106 between:

a first position 122, coupling (via the gap 108) the input 118 (of the connector waveguide) to the first waveguide 104a (having port P or opening O2) and the output 120 (of the connector waveguide) to the second waveguide having port T2 (or opening O3), so that the electromagnetic wave is transmitted from the first waveguide to the second waveguide via the connector waveguide; and a second position 124, de-coupling the input 118 from the first waveguide and the output 120 from the second waveguide.

Simulations

FIG. 2A shows a WR-3.4 waveguide integrated in two perfectly electrically conducting (PEC) waveguide blocks with smooth surfaces, separated by the small gap. FIG. 2(a) shows the reflections and transmission from one block to the other is shown as function of the gap between two waveguide blocks. For a 50 μm gap, a leakage of 1 dB occurs into parallel plate modes and the reflections increase to −20 dB.

Suppression of unwanted radiation, in a single direction, may be achieved by imposing anistropic high-impedance boundary conditions formed by soft- and hard surfaces [11]. EBG structures, similar to soft surfaces, can create a high-impedance boundary condition in two dimensions [12]. An EBG structure, in the form of a bed of square nails placed in a square lattice between two parallel plates, has been used to realize ridge gap waveguides, where parallel plate modes are suppressed and a local waveguide mode is supported [13]. This type of EBG structure also has been identified to be effective to realize contactless SPST waveguide switches [14]. This technology can also be used to realize a SPDT switch. General design rules for bandgap bandwidth, i.e. the bandwidth in which the excitation of parallel plate modes are prohibited are described in [15]. The dimensions of the EBG structure, in the presence of the waveguide, are optimized using full-wave simulations in CST Microwave Studio. The inset of FIG. 2(b) illustrates simulation of one waveguide with 8 nails on either side of the waveguide. The targeted frequency band for optimal operation is between 260 GHz and 280 GHz using an optimization goal of $S_{11} < -30$ dB.

TABLE I

Dimensions of the switch interface and EBG as depicted in Fig. 3. The wavelength, $\lambda_0$, is defined at 270 GHz

| Param. | Value [mm] ($\lambda_0$) | Param. | Value [mm] ($\lambda_0$) |
| --- | --- | --- | --- |
| $a_{WG}$ | 0.864 | $b_{WG}$ | 0.432 |
| $a_{ext}$ | 0.297 | $b_{ext}$ | 0.305 |
| $d_{WG}$ | 2.5 | $\tau_{bend}$ | 1.25 |
| $t_s$ | $2_{-0.01}^{+0.02}$ | $h_c$ | $1.97_{-0.01}^{+0.01}$ |
| $a_{EBG}$ | 0.208 (0.1872) | $p_{EBG}$ | 0.417 (0.3753) |
| $h_{EBG}$ | 0.278 (0.25) | g | 10 μ-60 μ (0.009-0.054) |

Table 1 tabulates the optimized dimensions (see FIGS. 3(a) and (b)) with the EBG dimensions normalized to the wavelength for the frequency of 270 GHz. The waveguide dimensions $a_{WG}$ and $b_{WG}$ are standard WR-3.4 definitions.

FIG. 2B shows the transmission and reflections of the waveguide in the presence of the optimized EBG and as function of gap height, showing no leakage can be observed in the full frequency band and the reflections lower than ~30 dB in the target frequency band.

The three waveguide terminals, $T_1$, P, $T_2$, should be as close as possible (as illustrated by $d_{WG}$ in FIG. 3B) to minimize ohmic dissipation losses in the U-bend waveguide and maximize the switching speed of the piezo-electric motor. However, a sufficient number of EBG periods should remain in between each terminal to maintain EBG functionality. We discovered that a small number (three nails) surrounding each waveguide is sufficient to ensure high isolation and low leakage, enabling waveguide separation and the required travel distance of $d_{WG}$=2.5 mm for the piezo-electric motor.

Figures 4A, 4B, 4C:
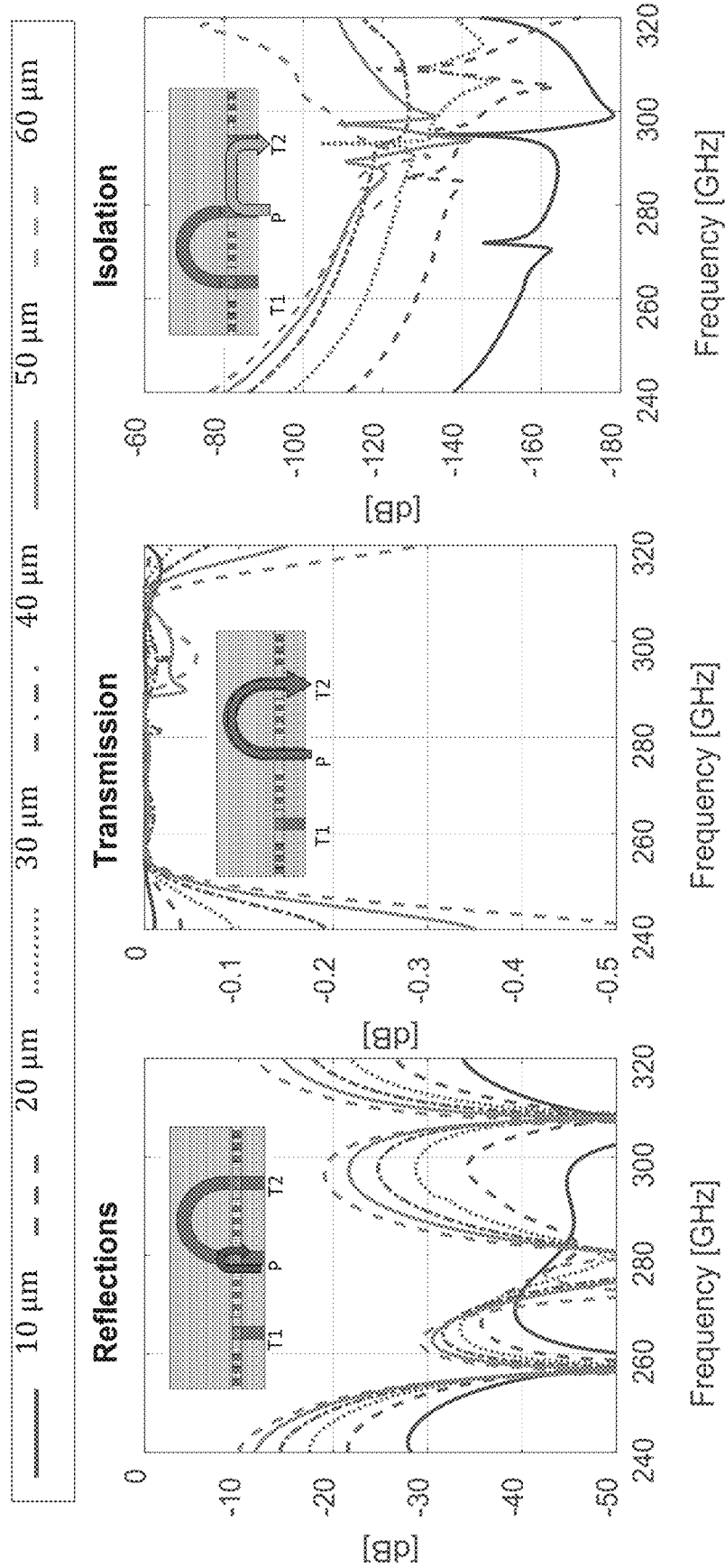
FIG. 4A-4C. Simulated reflections (FIG. 4A), transmission (FIG. 4B) and isolation (FIG. 4C) of the switch interface, as function of the gap height g.

FIG. 4 plots the simulated reflections, transmission and isolation of the full switching interface as function gap height, g. As compared to the single waveguide simulations plotted in FIG. 2B, a slightly increased resonant behavior can be identified in the reflection curves. However, the −20 dB and −30 dB bandwidths are maintained if the gap is smaller than g<60 µm. An extremely low isolation (<−80 dB) between the input terminal P and non-connected output terminal T is observed. Consequently, the SPDT waveguide switch is also very suitable for transceiver applications for which a high isolation is typically required to avoid receiver saturation.

FIG. 3C illustrates a Teflon spacer 300 inserted in high precision cavities fabricated in the waveguide block and used to ensure that the gap 108 height is not larger than 60 µm. The spacer 300 is required to avoid any metal-on-metal friction between the metallic switch block and waveguide block.

Example Fabrication and Assembly

Figures 5A, 5B, 5C:
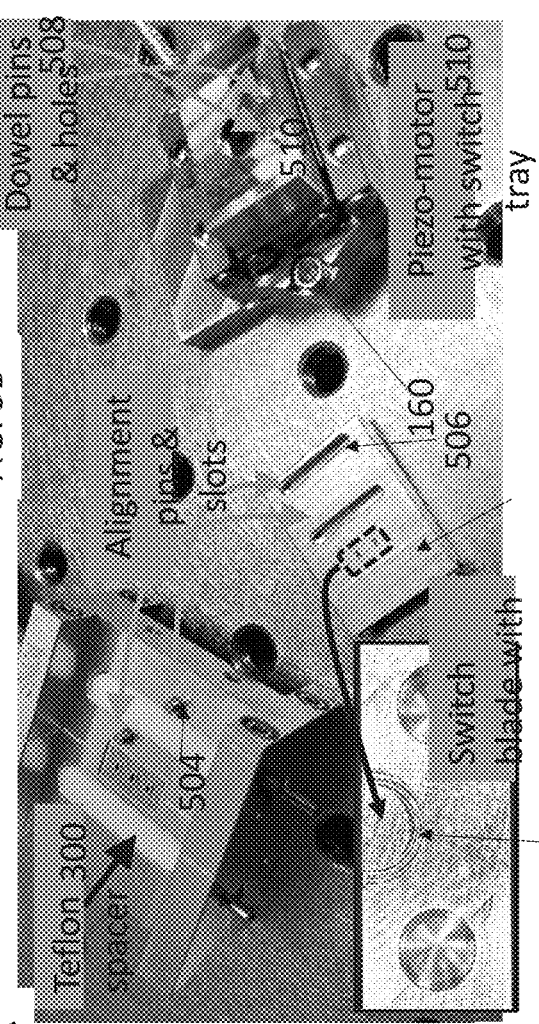

FIGS. 5A-5C illustrate the assembly of the fully metal machined split block with Teflon spacers and the piezoelectric motor 102 [16] to form a robust and low-loss waveguide integrated switch. FIG. 5A illustrates re-direction of the three waveguide terminals to different sides of the waveguide block for routing to different components of a THz application utilizing the switch.

FIG. 5B illustrates the allowed switching path in the switching direction 500 and the alignment error (Δy) of the switch blade in the non-switching direction 502. FIG. 5C illustrates alignment pins 504 and slots 506 used to define the switching path and reduce or minimize, or otherwise configure the alignment error Δy. The alignment pins 504 and slots 506 are placed with a ±10 µm position tolerance with respect to the positions of the waveguide terminals. Precision shims may be used to fix the motor assembly to the waveguide block while ensuring free movement of the switch blade over the switching path that is defined by the two pins and slots.

FIG. 5C further illustrates the switching element, body (e.g., blade) is connected to the piezo-motor by means of dowel pins 508 that fit into a switch tray 510 screwed on the motor 102 stage 160. FIG. 5D shows the motor is screwed on a metal plate attached to the sides of the waveguide block via two additional metal plates.

Figures 6A, 6B, 6C:
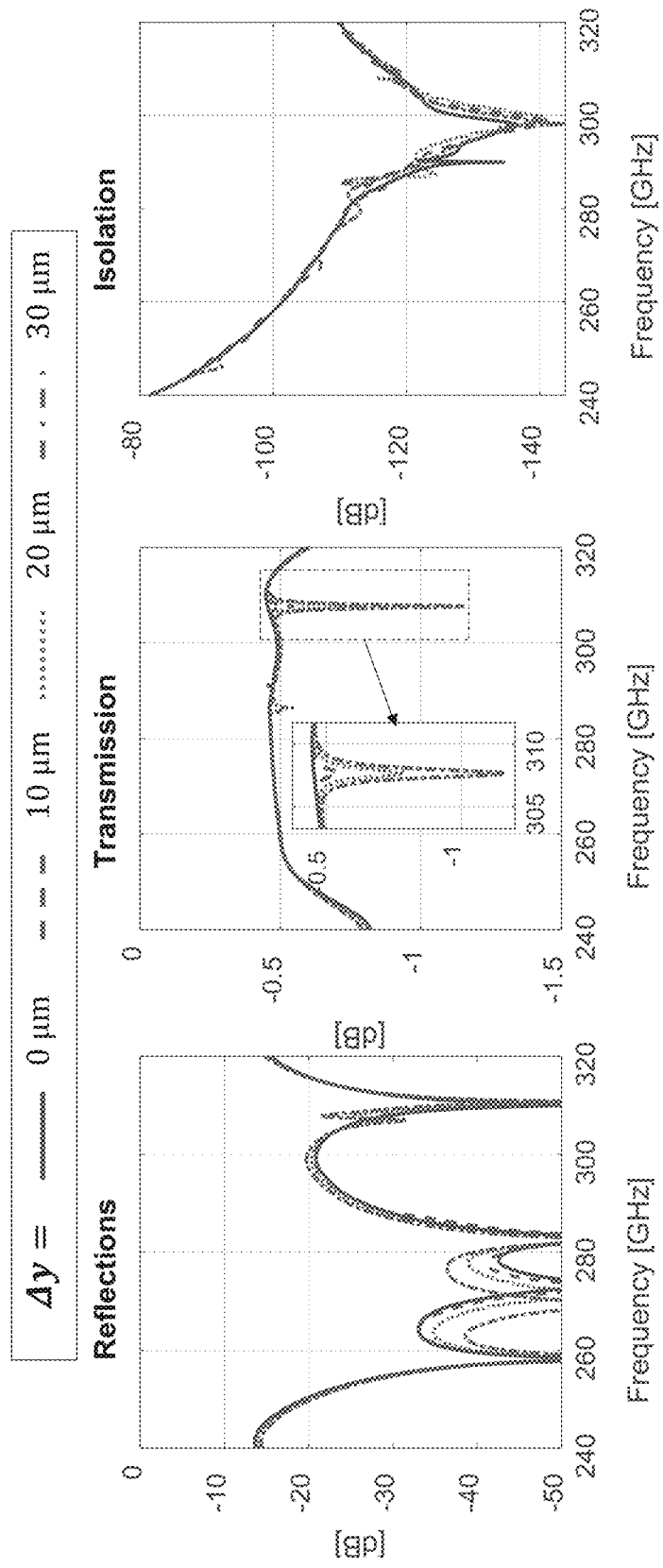

FIGS. 6A-C plot the reflections, transmissions, and isolation evaluating the switch performance, taking into account the full waveguide paths, as function of the switch blade alignment error Δy and for a gap height of g=50 µm and conductivity σ=4.1·10$^7$S/m. FIGS. 6A-6C demonstrate no significant effect in the reflections and isolation can be observed for appropriately minimized alignment errors. However, as shown in FIGS. 6(a)-(c), excitation of a resonant cavity mode between the switch blade 103 and waveguide block starts to appear in the transmission plot for a position error of Δy=30 µm at a frequency of 308 GHz. A reduction in transmission of less than 0.3 dB is expected for an achievable alignment accuracy of 20 µm. Switch losses of less than 0.5 dB are governed by the 17 mm long waveguides.

Characterization Measurements of the First Embodiment

Figure 7:
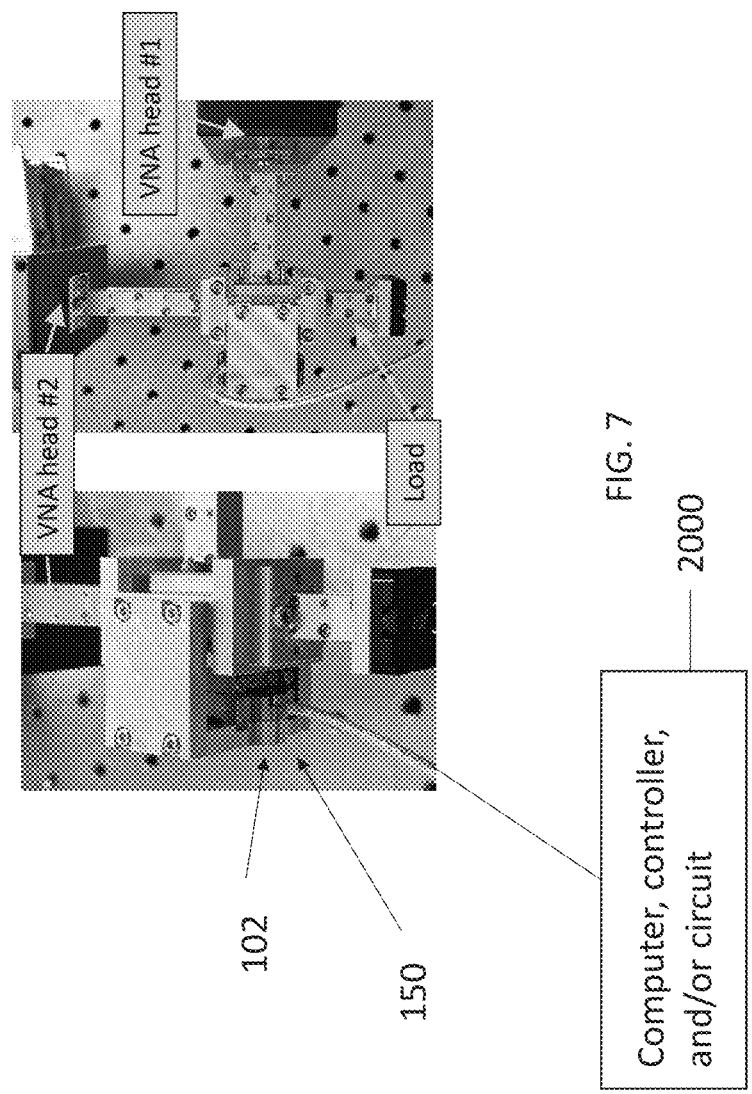
FIG. 7. Measurement setup. The common port and an output port are connected to a VNA whereas the other output port is terminated with a waveguide load.

The piezo-switch of FIG. 1 and FIG. 5 was characterized by measurement using a Keysight PNA-X vector network analyzer (VNA) and WR-3.4 frequency extenders from VDI. FIG. 7 illustrates connection of the VNA to the waveguide integrated switch with an $S_{21}$-link between the common port and one of the output waveguide ports and the other output waveguide port terminated by a waveguide load. The piezo-electric motor is connected to a desktop computer via a controller.

FIG. 8 plots the measured reflections, transmission and isolation (solid lines) of the piezo-switch solid lines in comparison with the simulation (black lines) for g=50 µm, Δy=0 µm). The isolation is measured as the $S_{21}$-link when the switch is directed to the waveguide load. The measured data shows good agreement between the measurements and simulations. Moreover, the measured reflections in the target frequency bandwidth for optimal operation (260 GHz to 280 GHz) are substantially below −25 dB, thereby enabling high-fidelity calibrations.

Figures 8A, 8B, 8C:
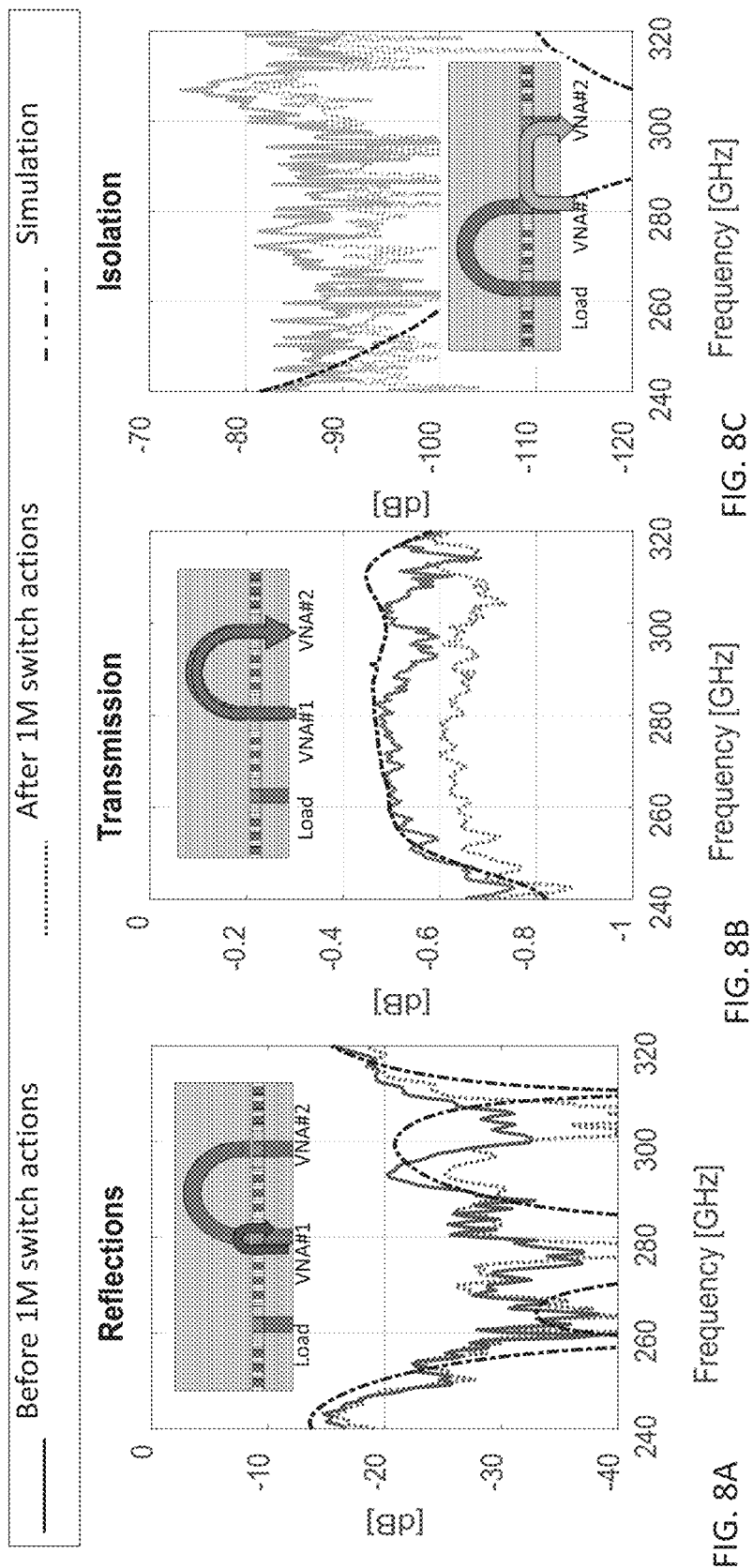
FIGS. 8A-8C. VNA measurements of the switch. A S21 link is established between the common port P and port T2 and a load is connected to T1. Shown are measurements before (solid lines) and after (dotted lines) performing 1 million switch actions, compared to the simulations (black), for reflections (FIG. 8A), transmission (FIG. 8B) and isolation (FIG. 8C).

The measured date further shows the waveguide integrated switch is characterized by a<−20 dB reflection bandwidth from 248 GHz to 312 GHz. FIG. 8(b) (a transmission plot) shows a measured insertion loss less than 0.6 dB. The undesirable excitation of a resonant cavity mode at 308 GHz (see previous section) cannot be identified in the transmission plot, confirming a good alignment of the switch blade in the non-switching direction, Δy.

The data further shows the isolation is measured to be lower −75 dB and is potentially limited to the dynamic range of the measurement setup and the quality of the calibration.

Durability of the piezo-switch was characterized by performing a total of one million switching actions. In order to quantify any potential performance degradation, the switch was connected to the VNA for the first 18000 switching actions and the last 15000 switching actions and reflections and transmission were recorded for every tenth switching cycle. The measurements in FIGS. 8 and 9 show the switch performance after one million switching actions (dotted lines) show the performance of the switch is extremely stable and constant over time. Only minor differences can be identified in the reflections and isolation as a function of the number of switching actions. For example, the transmission reduced by approximately 0.15 dB, probably due to the accumulation of dirt and dust in the waveguide terminals while switching.

Figure 10:
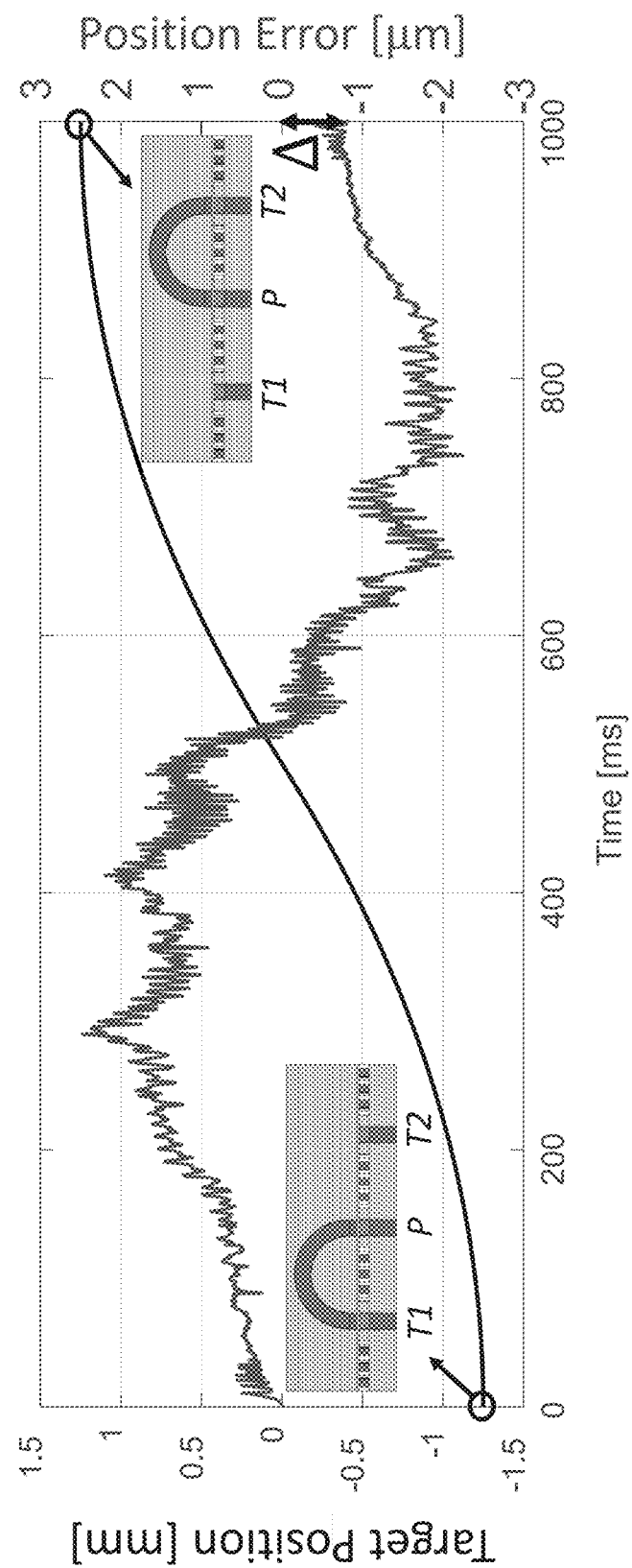
FIG. 10. Target position and position error during a single switch action where the switch is moved from $T_1$ to $T_2$. The final positioning error, when the switch stops its motion, is defined as Δ.

The piezo-electric motor [16] is coupled to a non-contact measuring optical linear encoder 150 (see FIG. 7 and [16]) configured to provide feedback of the switch position and position error with respect to a target position. FIG. 10 illustrates a typical switch action, in terms of target position and position error as function of time The motor is capable of achieving a top velocity of 6 mm/s and takes one second to perform a single switch action. This switching speed is sufficient for calibration purposes and is a significant improvement with respect to heavy flip mirrors. The targeted position is shown by the black curve and left y-axis whereas the position error, i.e. the deviation of the actual position with respect to the target position, is shown by the red curve and right y-axis. The final position error when the motor has stopped its motion (A in FIG. 10) is recorded every 10th switching cycle during a total of one million (1 M) switching actions for both switching positions.

Figure 11:
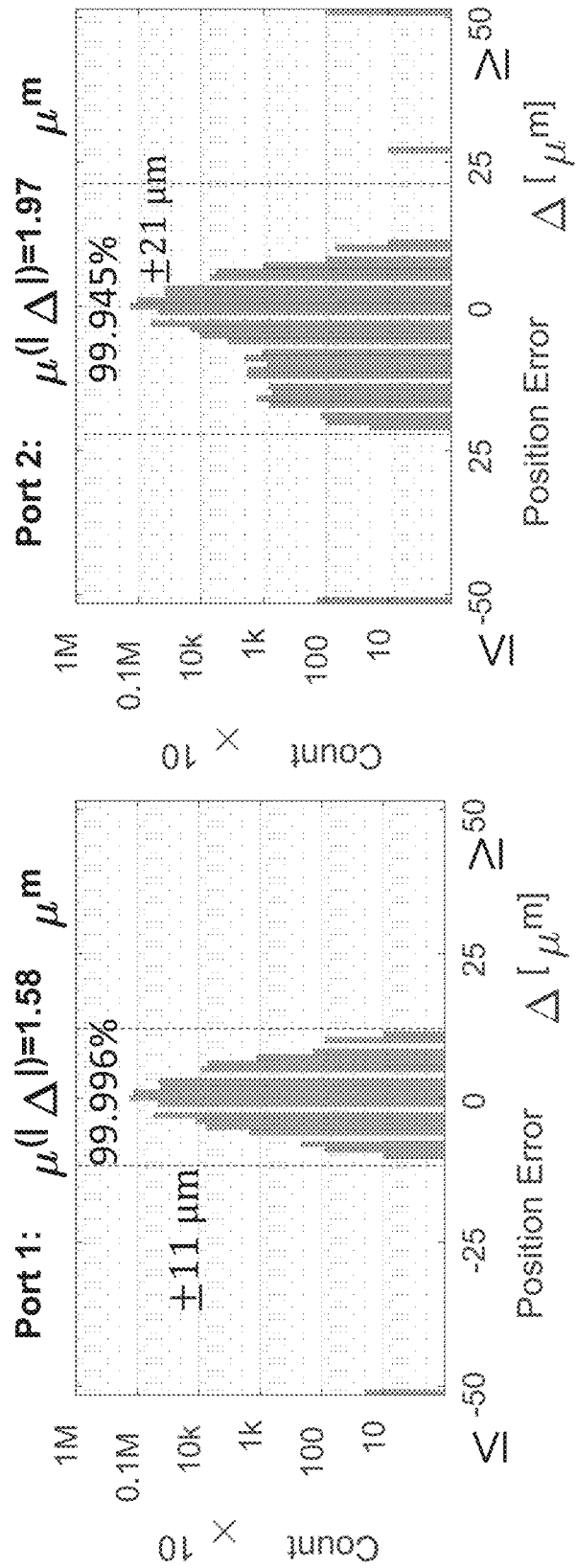
FIG. 11. Histogram of position error for port 1 (FIG. 11A) and port 2 (FIG. 11B). The mean absolute position error is μ(|Δ|)=1.57 μm and 1.97 μm for port 1 and 2 respectively. A total of 1 M switch actions is performed and the position error at each port location, Δ as shown in FIG. 10, is recorded every 10th switching cycle.
Figure 12:
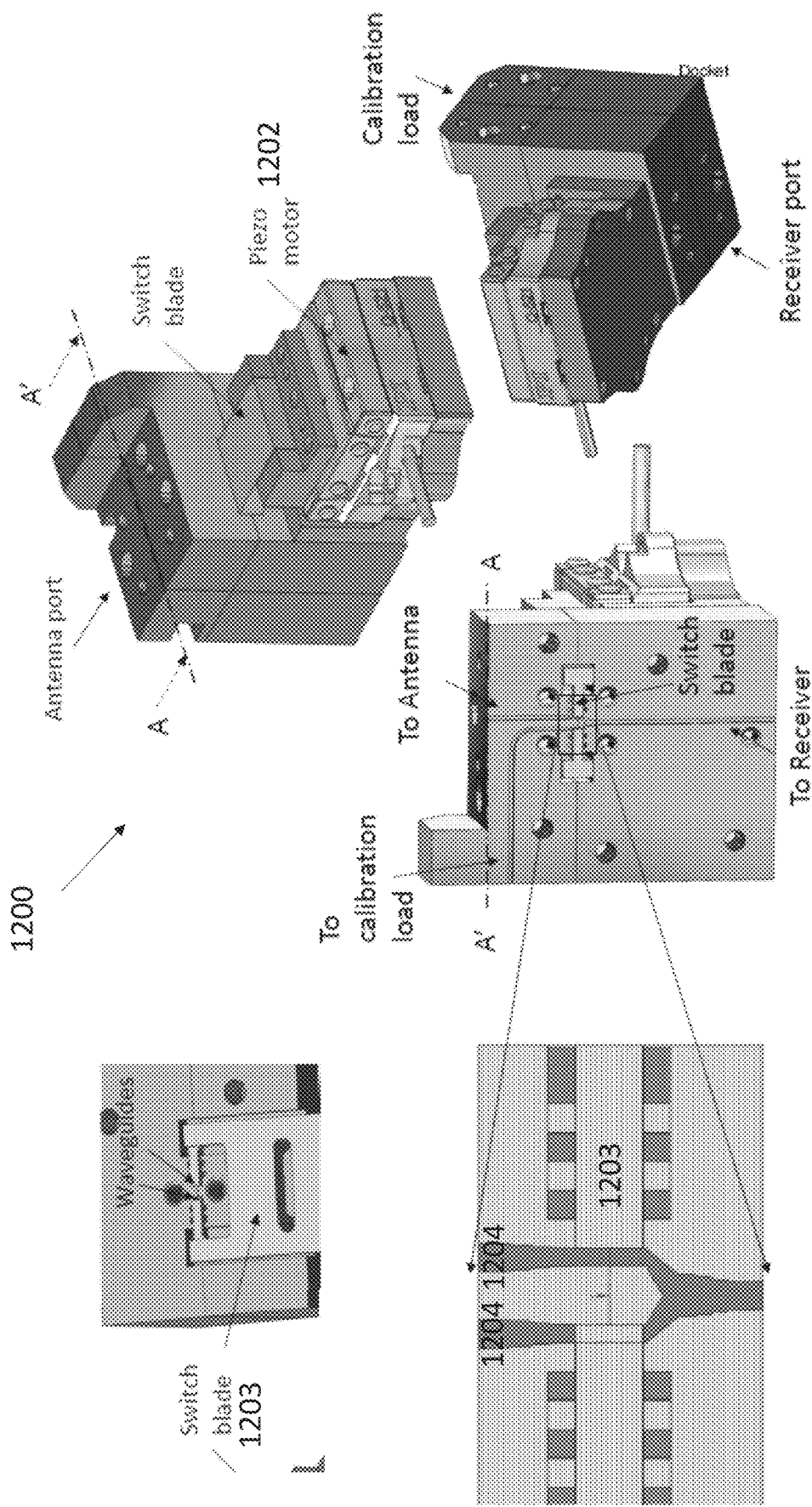
FIG. 12. Receiver system comprising a metallic switch blade according to a second example.
Figure 13:
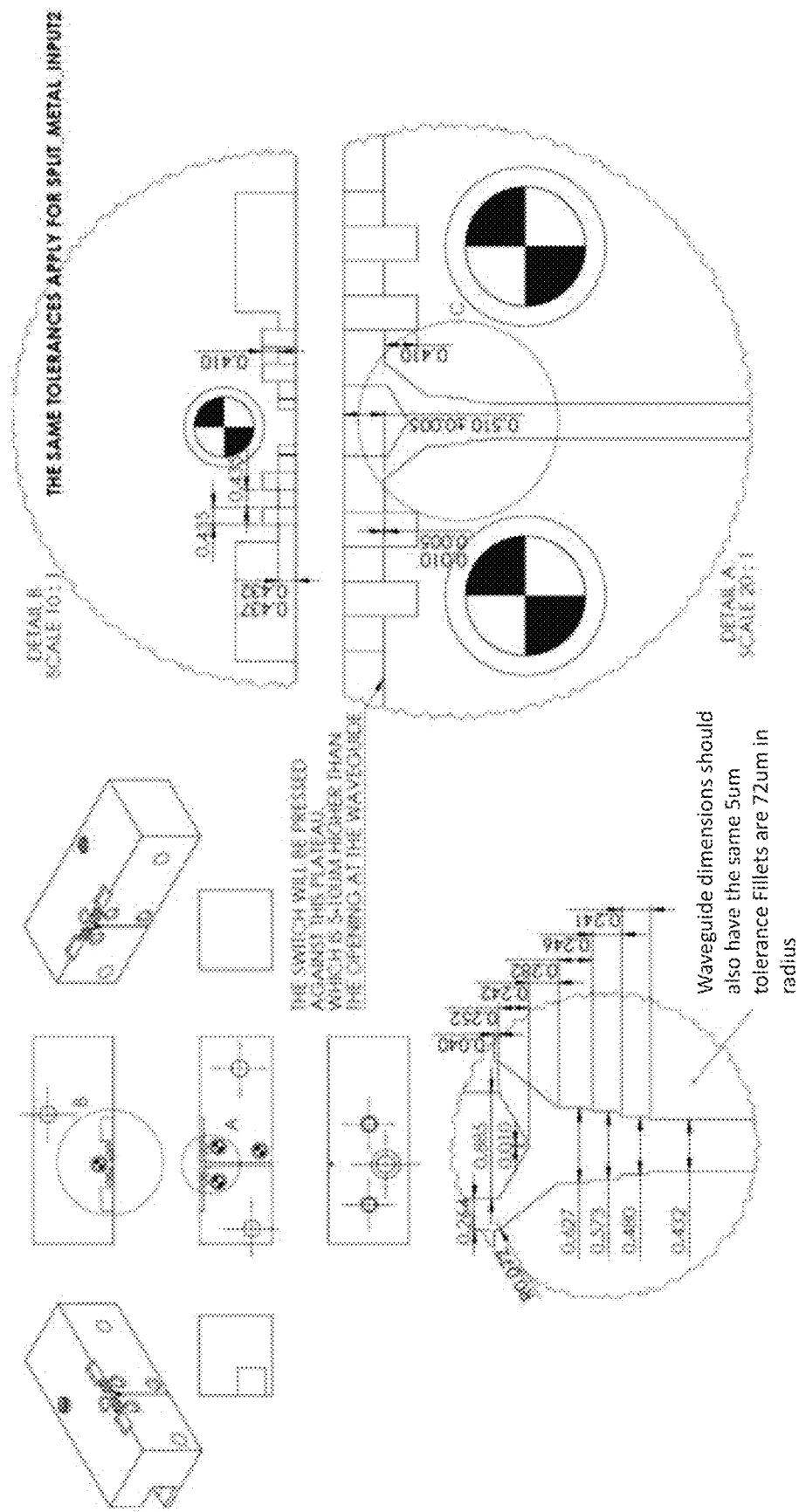
FIG. 13. Schematic illustrating waveguide and switch blade dimensions of the second example.
Figure 14:
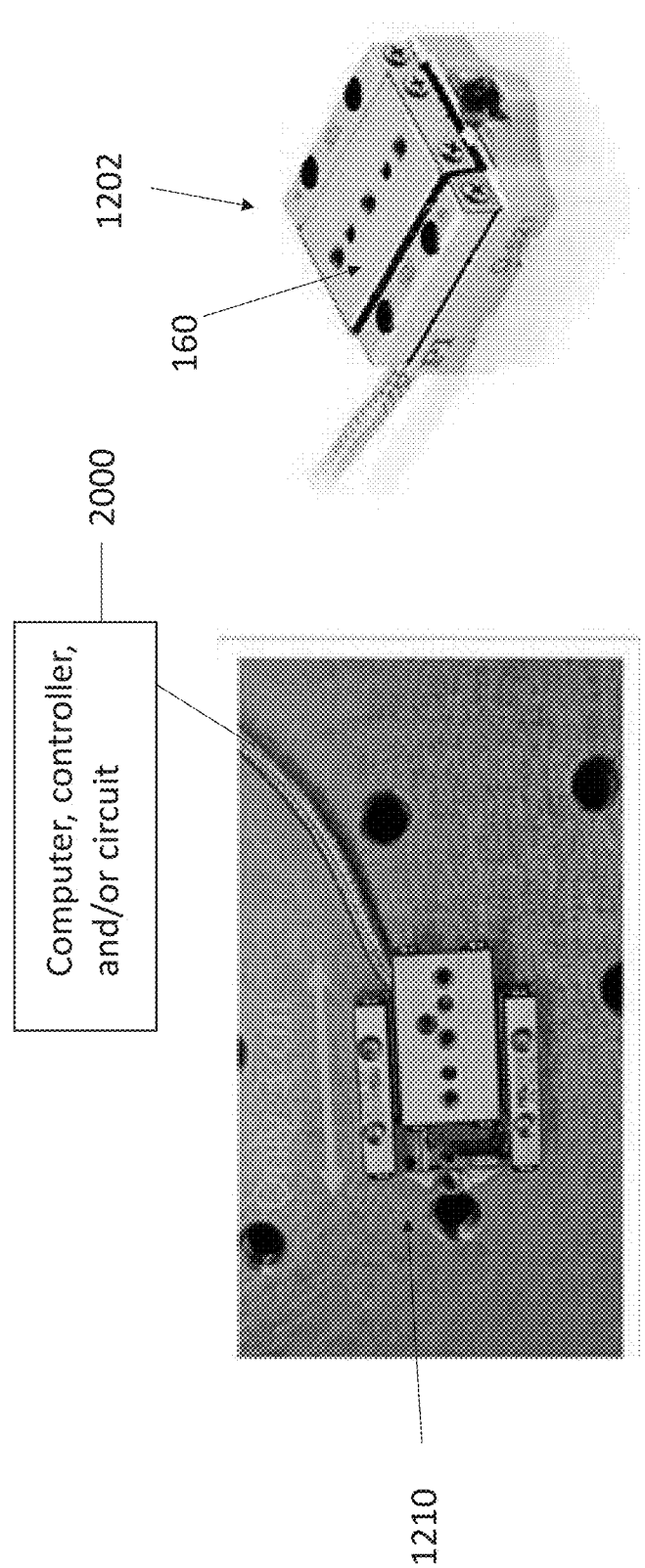
FIG. 14 illustrates a piezoelectric motor driving the metallic switch blade of the second example.

FIG. 11 is a histogram plotting the final position error $Δ^1$ for both ports. When switching to port 1, the mean absolute positioning error µ(|Δ|)=1.58 µm and 99.996% of the recordings are within a range of Δ=+11 µm. A position error of Δ<−50 µm was counted twice (0.004% of the total switch cycles). Possible explanations for such switching failures include the instantaneous positioning error exceeding the prescribed positioning error threshold, due to an increased friction or misalignment of the switch blade. In such event, the piezo-motor stops traveling to its target location and instead travels to the next target location.

During our testing, the switch never got fully stuck and always successfully resumed operation after an positioning error event. Those events occurred more frequently when traveling to port T2. For this port, the mean absolute positioning error is still very low, $\mu(|\Delta|)=1.97$ µm but with an increased rate of positioning error events to 0.055%. The shape of the shape of the histogram suggests that the switch tends to overshoot slightly, possibly due to tighter assembly on this side of the switch. Although the switching performance is sufficient for example applications, the switch positioning accuracy may be improved if the switching speed is reduced.

REFERENCES FOR FIRST EMBODIMENT

The following references are incorporated by reference herein.

R. H. Dicke, "The measurement of thermal radiation at microwave frequencies," in *Classics in Radio Astronomy*. Springer, 1946, pp. 106-113.

[2] J. Sobolewski and Y. Yashchyshyn, "State of the art sub-terahertz switching solutions," *IEEE Access*, vol. 10, pp. 12 983-12 999, 2022.

[3] M. Uzunkol and G. M. Rebeiz, "140-220 GHz SPST and SPDT switches in 45 nm CMOS SOI," *IEEE Microw. Wirel. Compon. Lett.*, vol. 22, no. 8, pp. 412-414, 2012.

[4] F. Meng, K. Ma, K. S. Yeo, and S. Xu, "Monolithic sub-terahertz SPDT switches with low insertion loss and enhanced isolation," *IEEE Trans. Terahertz Sci. Technol.*, vol. 8, no. 2, pp. 192-200, 2018.

[5] C. D. Cheon, M.-K. Cho, S. G. Rao, A. S. Cardoso, J. D. Connor, and J. D. Cressler, "A new wideband, low insertion loss, high linearity SiGe RF switch," *IEEE Microw. Wirel. Compon. Lett.*, vol. 30, no. 10, pp. 985-988, 2020.

[6] S. Tolunay Wipf, A. Go¨ritz, M. Wietstruck, C. Wipf, B. Tillack, and M. Kaynak, "D-band RF-MEMS SPDT switch in a 0.13 µm SiGe BiCMOS technology," *IEEE Microw. Wirel. Compon. Lett.*, vol. 26, no. 12, pp. 1002-1004, 2016.

[7] "W-band reflective SPDT PIN diode switch." [Online]. Available: https://www.eravant.com/75-to-110-ghz-30-db-isolation-wr-10-waveguide-w-band-reflective-spdt-pin-diode-switch{ } [Accessed:27 May 2022]

[8] T. Reck, C. Jung-Kubiak, and G. Chattopadhyay, "A 700-GHz MEMS waveguide switch," *IEEE Trans. Terahertz Sci. Technol.*, vol. 6, no. 4, pp. 641-643, 2016.

[9] U. Shah, T. Reck, H. Frid, C. Jung-Kubiak, G. Chattopadhyay, I. Mehdi, and J. Oberhammer, "A 500-750 GHz RF MEMS waveguide switch," *IEEE Trans. Terahertz Sci. Technol.*, vol. 7, no. 3, pp. 326-334, 2017.

[10] S. Rahiminejad, S. Van Berkel, R. H. Lin, C. Jung-Kubiak, G. Chat-topadhyay, and M. Rais-Zadeh, "A MEMS contactless rotating terahertz waveguide switch," in 2022 *IEEE 35th International Conference on Micro Electro Mechanical Systems Conference (MEMS)*, 2022, pp. 223-226.

[11] P.-S. Kildal, "Definition of artificially soft and hard surfaces for elec-tromagnetic waves," *Electronics Letters*, vol. 24, no. 3, pp. 168-170, 1988.

[12] D. Sievenpiper, L. Zhang, R. Broas, N. Alexopolous, and E. Yablonovitch, "High-impedance electromagnetic surfaces with a forbidden frequency band," *IEEE Trans. Microw. Theory. Tech.*, vol. 47, no. 11, pp. 2059-2074, 1999.

[13] P.-S. Kildal, E. Alfonso, A. Valero-Nogueira, and E. Rajo-Iglesias, "Local metamaterial-based waveguides in gaps between parallel metal plates," *IEEE Antennas Wirel. Propag. Lett.*, vol. 8, pp. 84-87, 2009.

[14] S. Rahiminejad, P. Enoksson, and S. Haasl, "Contactless waveguide switch and method for manufacturing a waveguide switch," Dec. 3 2020, U.S. patent application Ser. No. 16/762,332.

[15] E. Rajo-Iglesias and P.-S. Kildal, "Numerical studies of bandwidth of parallel-plate cut-off realised by a bed of nails, corrugations and mushroom-type electromagnetic bandgap for use in gap waveguides," *IET microwaves, antennas & propagation*, vol. 5, no. 3, pp. 282-289, 2011.

[16] "Piezoelectric motor model/product number Q-521.140 by physic instrumente." [Online]. Available at https://www.physikinstrumente.com/en/products/linear-stages/miniature-linear-stages/q-521-q-motion-miniature-linear-stage-103151/, including but not limited to all downloads, specifications, and user manuals.

Second Embodiment Comprising Piezoelectric Motor Drive

Figure 15:
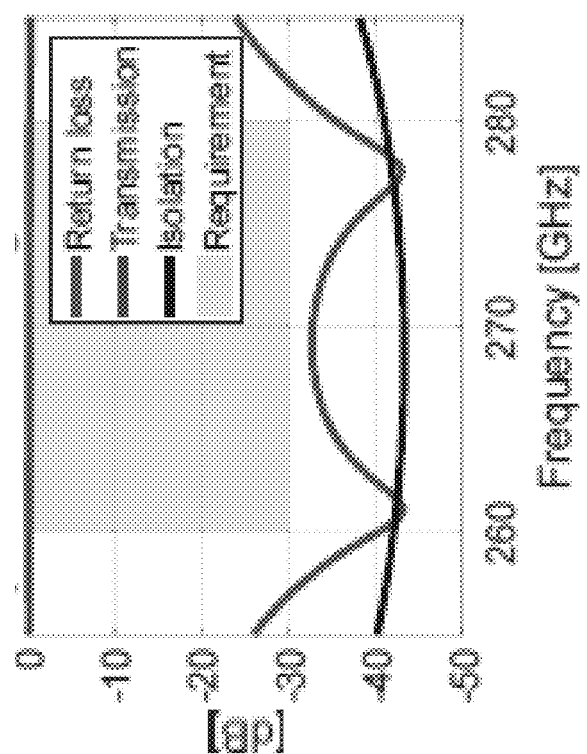
FIG. 15. Simulation showing the transmission and loss characteristics of the switch comprising metallic switch blade of the second example.

FIGS. 12-15 illustrate a low-loss terahertz switch 1200 comprising a Y-junction waveguide section where the terahertz receiver system is connected to the Y-input and the load and antenna are connected to the two Y-branches comprising waveguides 1204. The switch further comprises a metallic switch blade 1203 whose position is precisely controlled (with nanometer precision) by the piezo electric motor 1202 so as to open one waveguide 1204 branch (e.g., connected to the antenna) while simultaneously closing the other waveguide branch (connected to a waveguide load). FIG. 15 shows the switch 1200 is designed such that a minimal reflection (less than 30 dB) exists from the short-circuited branch back to the receiving system. The piezoelectric motor 1202 is the Q-521.140 miniature linear stage of reference [16] above.

Third Embodiment: Rotary Switch a. Structure

FIG. 16 illustrates an example switch comprising a U-bend waveguide 1650 placed in a rotating disc. The U-bend waveguide connects the main waveguide port to one of the two waveguide 1608 ports at a time. To isolate the main waveguide port (Port 1) from the "closed" waveguide port without mechanical contact, a metamaterial surface in the shape of corrugations surrounds the U-bend waveguide and a metallic surface is placed opposite the corrugations. The metallic surface is placed less than $\lambda/4$ from the U-bend waveguide to create a stop-band, thus confining the electromagnetic wave to propagate from the waveguide ports to the U-bend waveguide 1650 without any contact between the ports and the U-bend waveguide.

The disc rotates by actuating a rotating comb-drive to switch between positions P1 and P2 (FIG. 17B). The radius of the switch and comb-drive component is 4.25 mm (FIG. 17A). The springs consist of four serpentine arms, all connected to the anchor placed at the center of rotation [25]. The springs together with the long axis for the fingers were designed to rotate 4.5° in response to an applied voltage of 90 V. The rotating comb-drive was simulated using COMSOL Multiphysics [26].

b. Simulation

Figure 18A:
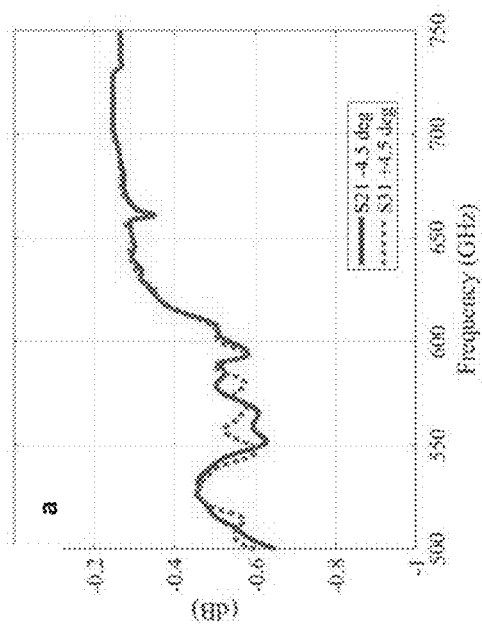
FIG. 18A. Transmission when port 1 and 2 are connected ($S_{21}$, blue solid) and when port 1 and 3 are connected ($S_{31}$, red dotted).
Figure 18B:
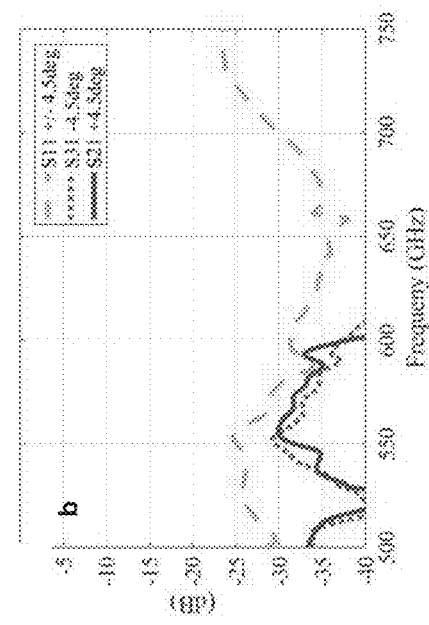
FIG. 18B Reflection at port 1 ($S_{11}$, orange dashed) and isolation during both when connecting 1-2 ($S_{31}$, red dotted) and 1-3 ($S_{21}$, blue solid).
Figure 19A:
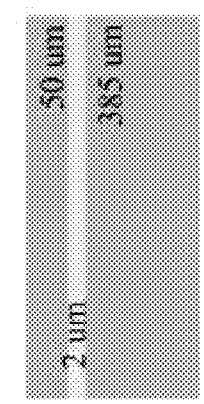
Figure 19B:
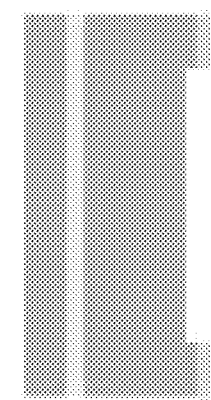
Figure 19C:
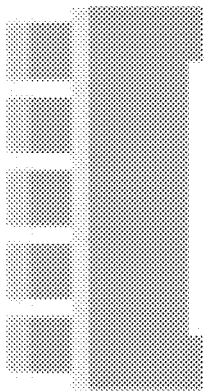
Figure 19D:
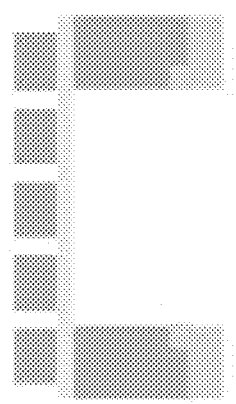
Figure 19E:
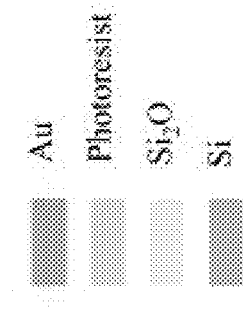

The waveguide section of the switch (FIG. 17C) was simulated with ANSYS Electronics Desktop [27]. The simulated transmission, reflection and isolation of the switch are presented in FIG. 18. The simulations have 10 µm gap from the connecting waveguide to ports as well as 5 µm space underneath the waveguide disc to allow free rotational movement. The simulations only present data for the waveguide disc and do not include the length of the connecting waveguides (which depend on the system).

c. Fabrication

FIG. 19 shows the schematic process flow for fabricating the rotating MEMS waveguide switch. An SOI wafer with the following dimensions was used: 50 µm device layer/2 µm buffered oxide (BOX) layer/385 µm handle layer (FIG. 19A). The back side of the wafer is patterned and etched 5 µm to define the spacers that allow for free rotation of the switch (FIG. 19B). The front side of the wafer is patterned and etched using a deep reactive ion etch (DRIE) process (FIG. 19C). The back side of the wafer is also patterned and etched using a silicon DRIE process (FIG. 19D). The BOX layer is removed from the back using dry etching and the key parts are sputtered with Ti/Au to make electrical contacts for the application of an actuation voltage (FIG. 19E).

d. Characterization

The three arms of the MEMS switch are actuated at the same time allowing the moment to be three times larger compared to that for one arm (for the same voltage). The actuation voltage needed was determined by applying an increasing voltage with probes until the line marker (FIG. 17E-FIG. 17F) matches the opposing Vernier lines at 4.5° for both directions.

Figure 20A:
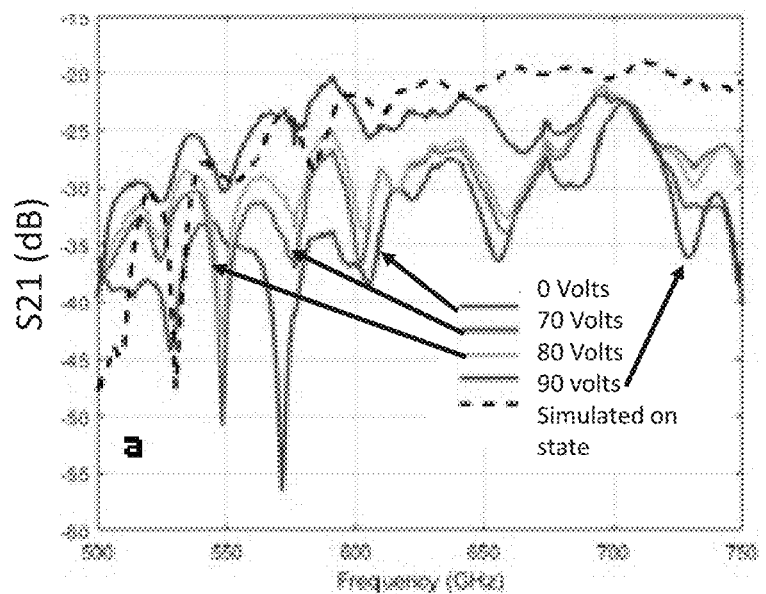
FIG. 20A Measured $S_{21}$ for different applied voltages, together with simulated $S_{21}$ (black dashed line) when the block is split at the top and has a 5 μm gap.
Figure 20B:
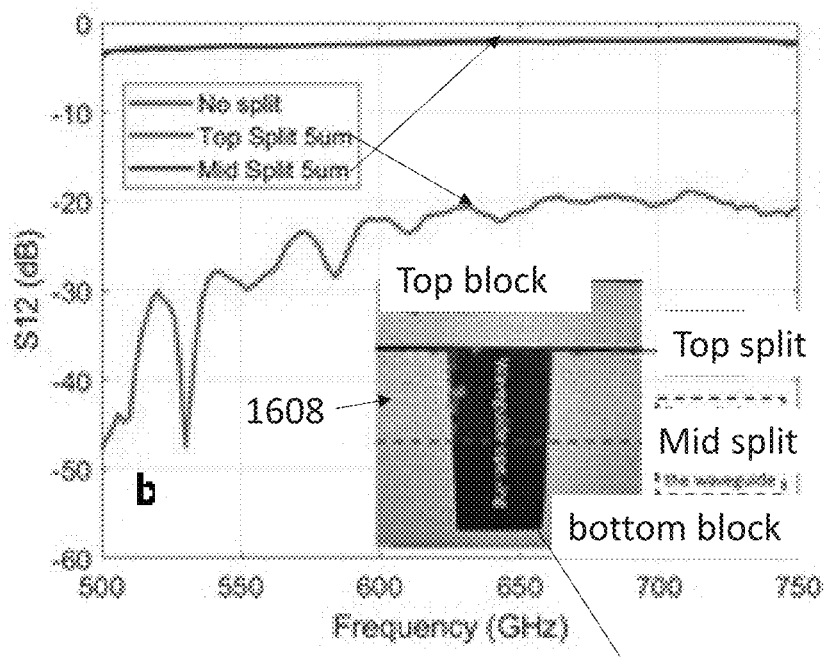
FIG. 20B is a simulated $S_{21}$ when connecting Ports 1 and 2 for an ideal block without a split (blue), with a split at the top of the waveguide (purple), and when split is at the middle (orange).

The MEMS switch was placed inside the measurement block with the three connecting waveguide ports milled into it. The block was connected to a network analyzer (PNA-X) with two VDI extenders for characterization. The applied voltage to the MEMS switch was increased from 70 V to 90 V, with 90 V placing the MEMS switch in its fully actuated state, and the transmission was measured. FIG. 20A shows the increase of transmission with the applied voltage, although in its fully actuated state, S21<−20 dB. The modelled S21 value for the switch, including the waveguide losses, was around −3 dB. FIG. 20b shows the reason for the added loss is the larger than expected split between the two block parts placed at the edge of the waveguide (providing an additional 5 micrometer gap). Simulations show that this gap, together with transmission to around −20 dB (FIG. 20B), agrees with the measurement results. Example waveguide blocks defining a waveguide 1608 using a top block and a bottom block include those described in [30].

REFERENCES FOR THIRD EMBODIMENT

The following references are incorporated by reference herein.

[1] P. H. Siegel, "Terahertz technology," pp. 910-928, March 2002.

[2] K. B. Cooper and G. Chattopadhyay, "Submillimeter-wave radar," IEEE Microwave Magazine, vol. 15, no. 7, November 2014, pp. 51-67.

[3] S. Gulkis, et al, "MIRO: Microwave instrument for Rosetta orbiter," Space Science Reviews, vol. 128, no. 1-4, pp. 561-597, May 2007.

[4] L. Larson, R. Hackett, M. Melendes, and R. Lohr, "Micromachined microwave actuator (MIMAC) technology-a new tuning approach for microwave integrated circuits," IEEE Microwave and Millimeter-Wave Monolithic Circuits Symposium, 1991.

[5] H.-C. Lee, J.-Y. Park, and J.-U. Bu, "Piezoelectrically actuated RF MEMS DC contact switches with low voltage operation," IEEE Microwave and Wireless Components Letters, vol. 15, no. 4, 2005.

[6] M. Tang, A. Q. Liu, and A. Agarwal, "A low-loss single-pole-double throw (SPDT) switch circuit," International Conference on Solid-State Sensors, Actuators and Microsystems (transducers), 2007, pp. 675-678.

[7] H. Zareie and G. M. Rebeiz, "Compact high-power SPST and SP4T RF mems metal-contact switches," IEEE Transactions on Microwave Theory and Techniques, vol. 62, no. 2, pp. 297-305, 2014.

[8] A. Kashani Ilkhechi, H. Mirzajani, E. Najafi Aghdam, and H. Badri Ghavifekr, "A new electrostatically actuated rotary three-state DC contact RF MEMS switch for antenna switch applications," Microsystem Technologies, vol. 23, no. 1, pp. 231-243, January 2017.

[9] G. M. Rebeiz and J. B. Muldavin, "RF MEMS switches and switch circuits," IEEE Microwave Magazine, vol. 2, no. 4, pp. 59-71, December 2001.

[10] T. Seki, Y. Uno, K. Narise, T. Masuda, K. Inoue, S. Sato, F. Sato, K. Imanaka, and S. Sugiyama, "Development of a large-force low-loss metal-contact RF MEMS switch," Sensors and Actuators, A: Physical, vol. 132, no. 2, pp. 683-688, November 2006.

[11] Y. Uno, K. Narise, T. Masuda, K. Inoue, Y. Adachi, K. Hosoya, T. Seki, and F. Sato, "Development of SPDT-structured RF MEMS switch," International Conference on Solid-State Sensors, Actuators and Microsystems (Transducers), 2009, pp. 541-544.

[12] M. Daneshmand, R. Mansour, and N. Sarkar, "RF MEMS waveguide switch," IEEE MTT-S International Microwave Symposium Digest, vol. 2.2004, pp. 589-592.

[13] Z. Baghchehsaraei, U. Shah, J. Aberg, G. Stemme, and J. Oberhammer, "MEMS reconfigurable millimeter-wave surface for V-band rectangular-waveguide switch," International Journal of Microwave and Wireless Technologies, vol. 5, no. 3. Cambridge University Press, June 2013, pp. 341-349.

[14] N. Vahabisani and M. Daneshmand, "Monolithic millimeter-wave MEMS waveguide switch," IEEE Transactions on Microwave Theory and Techniques, vol. 63, no. 2, pp. 340-351, 2015.

[15] U. Shah, T. Reck, E. Decrossas, C. Jung-Kubiak, H. Frid, G. Chattopadhyay, I. Mehdi, and J. Oberhammer, "500-750 GHz submillimeter-wave MEMS waveguide switch," IEEE MTT-S International Microwave Symposium (IMS), May 2016, pp. 1-4.

[16] T. Reck, C. Jung-Kubiak, and G. Chattopadhyay, "A 700-GHz MEMS Waveguide Switch," IEEE Transactions on Terahertz Science and Technology, vol. 6, no. 4, pp. 641-643, 2016.

[17] T. Amin, M. Huda, Y. Ning, G. Mckinnon, and J. Tulip, "A virtual pivot point MEMS rotary comb actuator for tunable laser applications," Proceedings of SPIE—The International Society for Optical Engineering, vol. 8490, oct 2012, p. 84900D.

[18] J. Briere, M. Y. Elsayed, M. Saidani, M. Berard, P. O. Beaulieu, H. Rabbani-Haghighi, F. Nabki, and M. M'enard, "Rotating circular micro-platform with integrated waveguides and latching arm for reconfigurable integrated optics," Micromachines, vol. 8, no. 12, p. 354, dec 2017.

[19] E. Yablonovitch, "Inhibited Spontaneous Emission in Solid-State Physics and Electronics," Physical Review Letters, vol. 58, no. 20, pp. 2059-2062, 1987.

[20] P.-S. Kildal, "Definition of artificially soft and hard surfaces for electromagnetic waves," Electronics Letters, vol. 24, no. 3, pp. 168-170, 1988.

[21] R. J. King, D. V. Thiel, and K. S. Park, "The Synthesis of Surface Reactance Using an Artificial Dielectric," IEEE Transactions on Antennas and Propagation, vol. 31, no. 3, pp. 471-476, 1983.

[22] D. Sievenpiper, L. Zhang, R. F. J. Broas, N. G. Alexopolous, and E. Yablonovitch, "High-impedance electromagnetic surfaces with a forbidden frequency band," IEEE Transactions on Microwave Theory and Techniques, vol. 47, no. 11, pp. 2059-2074, 1999.
[23] P.-S. Kildal, "Three metamaterial-based gap waveguides between parallel metal plates for mm/submm waves," 3rd European Conference on Antennas and Propagation (EuCAP), vol. 8, no. March 2009, pp. 84-87
[24] J. Tayebpour, B. Ahmadi, M. Fallahzadeh, O. Shekoofa, and A. Torabi, "A waveguide switch based on contactless gap waveguide technology," IEEE Microwave and Wireless Components Letters, vol. 29, no. 12, pp. 771-774, dec 2019.
[25] J. A. Yen, C. N. Chen, Y. S. Lui, "Large rotation actuated by in-plane rotary comb-drives with serpentine spring suspension", Journal of Micromechanics and Microengineering, 201-206, 2005
[26] COMSOL Multiphysics® v. 5.5. www.comsol.com. COMSOL AB, Stockholm, Sweden.
[27] ANSYS® Electromagnetics Suite, Release 2019 R2, Help System, Electronics Desktop, ANSYS, Inc.
[28] 2022 IEEE 35th International Conference on Micro Electro Mechanical Systems Conference (MEMS), A MEMS Contactless Rotating Terahertz Waveguide Switch by Sofia Rahiminejad, Sven van Berkel, Robin H. Lin, Cecile Jung-Kubiak, Goutam Chattopadhyay, and Mina Rais-Zadeh.
[29] US Patent Publication No. 20200381793
[30] Low loss microelectromechanical system (mems) phase shifter by Sofia Rahiminejad, Maria A. Del Pino, Cecile D. Jung-Kubiak, Theodore J. Reck, and Goutam Chattopadhyay, US. Patent Publication No. 20210013569.

Example Applications

Figure 21:
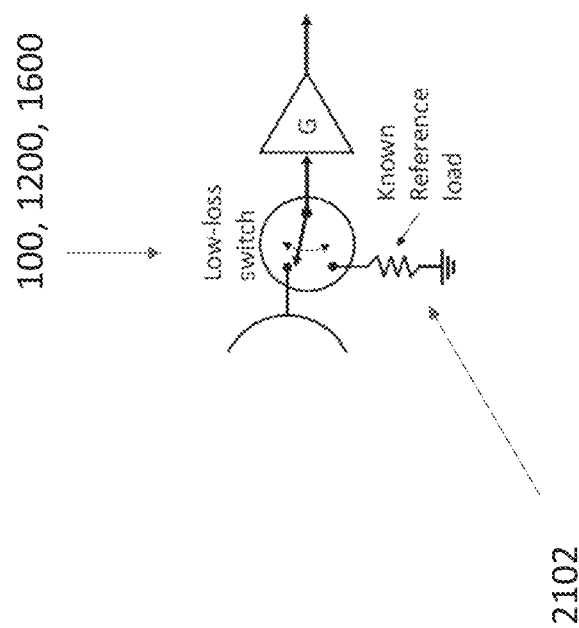
FIG. 21. Example application including a switch according to embodiments described herein.

FIG. 21 illustrates an example wherein the switch is used to switch between a reference load (e.g., for calibration of a sub-millimeter instrument such as a receiver) and an antenna.

Figure 22:
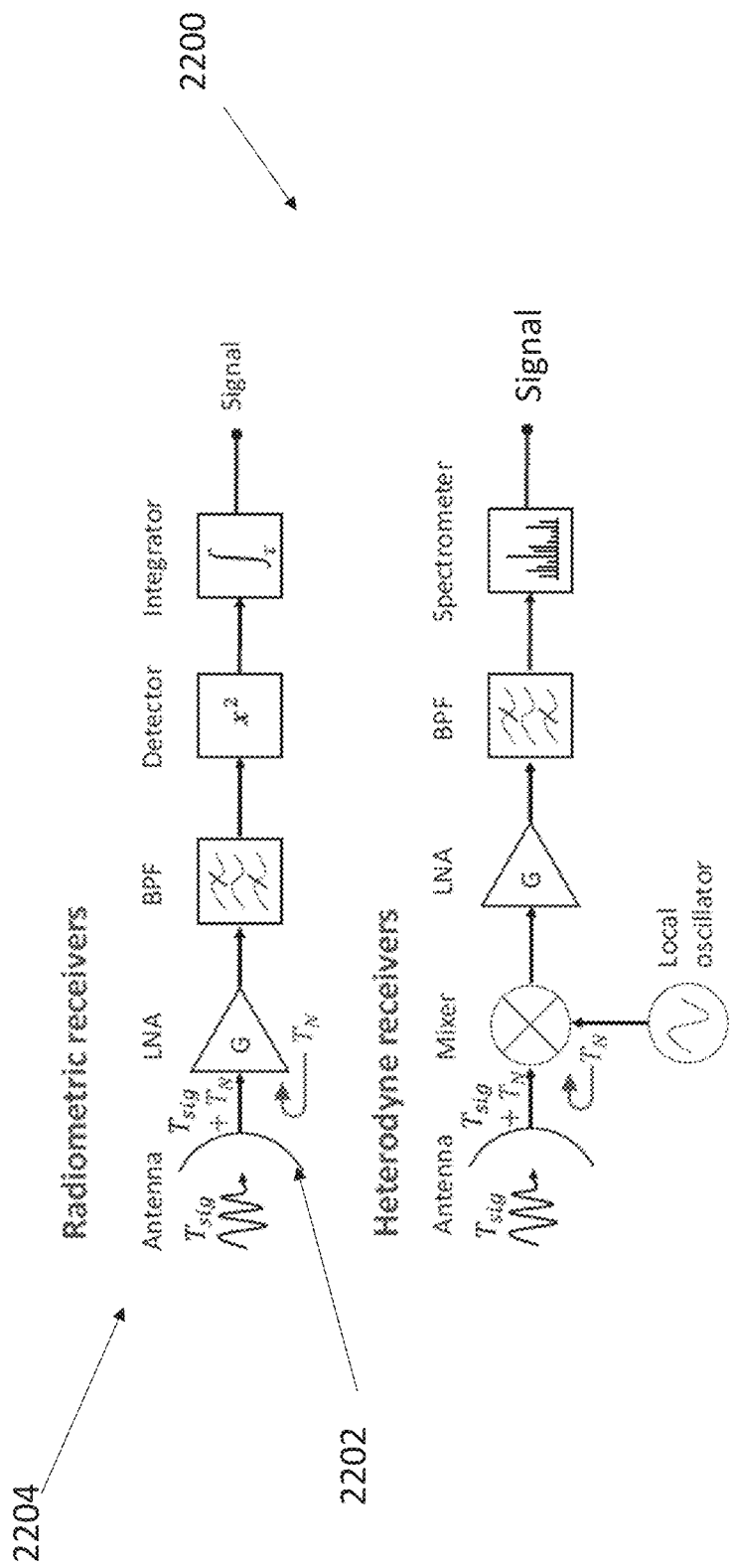
FIG. 22. Example receiver systems comprising a switch according to embodiments described herein.

FIG. 22 illustrates example receivers comprising a switch according to embodiments described herein, wherein the switch is positioned between the amplifier or mixer and the antenna so as to switch between the antenna and a calibration load. Embodiments of the present invention can be implemented in compact sub-millimeter wave instruments comprising the receiver with reduced power, volume, and mass. In some embodiments, the switch is implemented with the instrument on a CubeSat platform. Example instruments include a spectrometer system having application in molecular spectroscopy measurements for astronomy and earth sciences [1]. Molecular spectroscopy instruments can provide essential information for remote study of atmospheric composition and for measuring the surface properties of cold planetary and cometary bodies. Some of the advantages of operating at submillimeter-wave frequencies are the availability of wide-open bandwidths, high resolution possibilities, and high signal to noise ratio, due to the strong absorbance at these high frequencies, but at the cost of dealing with tight tolerances, and difficulty with integration [2]. Some submillimeter-wave spectrometers and radars are currently being developed to measure a variety of new science objectives, many of them are focused on detecting water. At 557 GHz, the water line is several orders of magnitude stronger than at lower frequencies, thus increasing the chances to detect water on cold bodies. Calibration of these systems rely mostly on large, bulky quasi-optical flip-mirrors to redirect the receiver path to a free-space absorber [3]. A low-loss single-pole double-throw (SPDT) THz MEMS switch could replace flip-mirror based calibration system and thus help developing highly integrated spectrometer/radar systems with substantially reduced mass and power.

Process Steps

FIG. 23 illustrates a method of making a waveguide integrated switch.

Block 2300 represents providing or machining a waveguide body, block or member comprising one or more waveguides.

Block 2302 represents providing or fabricating a switching body or element or member.

Block 2304 represents coupling, using an actuator (or means for actuating or moving), the switching body to the one or more waveguides in the waveguide body, the actuator actuating the switching body to open or close transmission of an electromagnetic wave to the one or more waveguides and the waveguide configured and dimensioned to guide the electromagnetic wave having a frequency in a range of 100 gigahertz (GHz) to 1000 terahertz (THz); and wherein the actuator is configured to, or is capable of positioning the switching body relative to the waveguide with an accuracy in a range of 1-10 nanometers (e.g., 1 nm).

Block 2306 represents optionally coupling a position measuring device coupled to the switching body, the position measuring device measuring a position of the switching body relative to the waveguide with nanometer resolution.

Block 2308 represents coupling a controller, circuit, or computer to the waveguide integrated switch, for controlling the position of the switching body.

Block 2310 represents the end result, a waveguide integrated switch.

Illustrative embodiments of the waveguide integrated switch include, but are not limited to, the following (referring also to FIGS. 1-22).

1. A waveguide integrated switch 100, 1200, 1600 comprising:
an actuator 102, 1202, 1602 comprising a switching body, member, element or piece 103, 1203, 1604 coupled to one or more waveguides 104, 1204, 1608 the actuator actuating the switching body 102, 1203, 1604 to open or close transmission of an electromagnetic wave (or one or more electromagnetic waves or fields) to the one or more waveguides 104 and the one or more waveguides 104, 1608, 1204 are configured and dimensioned to guide the electromagnetic wave having a frequency in a range of 100 gigahertz (GHz) to 1000 terahertz (THz). The actuator 102, 1602 is configured to positions the switching body 1604 relative to the waveguides 104, 1608 with an accuracy in a range of 1-10 nanometers.

2. The switch of example 1, further comprising a position measuring device coupled to the switching body 103, the position measuring device measuring a position of the switching body relative to the waveguide with nanometer resolution (e.g., accuracy in a range of 1 nm 1-10 nm, or 1 nm-1000 micrometers, 1 micron-1000 micrometers, 1-10 microns, 1-20 microns, 1-50 microns 1-100 microns, 200-500 microns, 200-800 microns, etc).

3. The switch of example 1 or 2, wherein the actuator comprises a piezoelectric motor 102.

4. The switch of any of the examples 1-3, wherein the position measuring device 150, 1210 comprises an optical linear encoder 150, 1210 only optically coupled to the switching body or a stage 160 moving the switching body (i.e., no physical contact between the switching body or the stage moving the switching body).

5. The switch of any of the examples 1-4, wherein the actuator 102 comprises a Microelectromechanical systems (MEMS) device 1600 including a motor coupled to the switching body 1604 and the position measuring device comprises a scale 1606 (e.g., vernier scale) or ruler having nanometer scale (1-1000 nm) or micrometer scale (1-1000 microns) graduations on or coupled to the switching body.

6. The switch of any of the examples 1-5, further comprising a circuit, controller, and/or computer 2000 coupled to the actuator, the circuit, computer, and/or controller 2000 applying a voltage controlling the position of the switching body 1203, 103, 1504 using a feedback comprising a measurement of the position relative to a target position obtained using the position measuring device 1606, 150, 1210.

7. The switch of any of the examples 1-5 or 6, wherein the circuit comprises a feedback circuit comprising a feedback loop obtaining the measurement.

8. The switch of any of the examples 1-4, 6 or 7, further comprising:
the switching body 103 comprising a metal switching element;
the actuator 102 comprising a piezoelectric motor coupled to the switching element;
a circuit coupled to the piezoelectric motor, the piezoelectric motor moving a position of the switching element 106 between a first position 122 and a second position 124 in response to one or more voltage signals applied by the circuit to the piezoelectric motor, wherein:
the first position 122 couples the switching element to at least one of the waveguides 104 comprising a first waveguide or a second waveguide,
the second position 124 de-couples the switching element from the at least one of the first waveguide or the second waveguide; and wherein:
the first waveguide and the second waveguide are configured and dimensioned to guide an electromagnetic wave having a frequency in a range of 100 gigahertz (GHz) to 1000 terahertz (THz).

9. The switch of any of the examples 1-8, further comprising:
a feedback circuit providing feedback to the circuit, the feedback comprising at least one of:
an error in the position, or
the position, comprising a measured position, with respect to a target position.

10. The switch of example 9, further comprising an optical linear encoder optically coupled to the switching element for measuring the measured position.

11. The switch of any of the examples 1-10, wherein:
the switching element comprises a curved connector 106 waveguide configured and dimensioned to guide the electromagnetic wave (having a frequency in a range of 100 gigahertz (GHz) to 1000 terahertz (THz), the curved connector waveguide having an input 118 and an output 120; and
the piezoelectric motor moves the input 118 and the output 120 along a linear switching direction 500 between:
the first position 122, coupling the input 118 to the first waveguide via the gap 108 (at the position of the terminal P to the first waveguide) and the output to the second waveguide via the gap 108 (at the position of the terminal T1 or T2 to the second waveguide), so that the electromagnetic wave is transmitted from the first waveguide to the second waveguide via the connector waveguide, and
the second position 124, de-coupling the input from the first waveguide and the output from the second waveguide.

11. The switch of example 11, wherein the connector waveguide 106 comprises a U-shaped waveguide.

12. The switch of any of the examples 1-11, further comprising:
a metal waveguide block 112 comprising the first waveguide 104a and the second waveguide 104b, the metal waveguide block having a first metal surface comprising an electromagnetic bandgap surface 114 surrounding a first opening O2 spaced from a second opening O3 along the linear direction, wherein:
the first opening O2 comprises a first input to, or a first output from, the first waveguide; and
the second opening O3 comprises a second input to, or a second output from, the second waveguide;
the metal switching element 103 comprising a metal piece comprising a second metal surface 116 including the input 118 separated from the output 120 along the linear switching direction 500;
an electrically insulating spacer 300 spacing the first metal surface 114 from the second metal surface 116 so as to fix the gap 108, comprising an electrically insulating gap of less than 60 microns between the first metal surface 114 and the second metal surface 116, at:
the first position 120, wherein, in a first direction of the gap, the first opening O2 is aligned with the input 118 and the second opening O3 is aligned with the output 120, and
the second position 120, wherein, in the first direction of the gap 108, the input is mis-aligned with the first opening O2 and the output is misaligned with the second opening O3;
alignment pins 504 fixing a third position of the metal switching element relative to the metal waveguide block, the third position in a second direction perpendicular 502 to the linear direction 500 between the first position 120 and the second position 122; and
fixing pins 508 securing the metal switching element 103 to the piezoelectric motor 102.

13. The switch of example 12, wherein the first position 120 and the second position 122 are positionable with 1 nanometer resolution or with an accuracy in a range of 1-1000 nm or 1-10 nm or 1-100 nm (e.g., 1'-nm≤position accuracy or precision ≤1000 nm, 10 nm, 100 nm).

14. A device 2200 comprising the switch 100, 1600, 1200 of any of the examples 1-14, further comprising an antenna 2202 and a calibration waveguide load 2102 coupled to a receiver 2204 via the switch, wherein the calibration waveguide or load comprises or is coupled to the first waveguide 104a (or the second waveguide 104b) and the antenna is coupled to the second waveguide (or the first waveguide).

16. A transceiver 2200, receiver, transmitter, or spectrometer comprising the switch of any of the examples 1-14.

17. The switch of any of the examples 1-16, wherein the waveguides 104, 106 comprise rectangular waveguides having a cross sectional area in a range of 100-5000 microns by 100-5000 microns and the connector waveguide has a length in a range of 5-10 mm.

18. The switch of any of The piezoelectric motor is compact and comprises direct position measurement with integrated incremental encoder (the encoder has a nm precision)

19. FIG. 1 and FIG. 16 illustrate the switch 100, 1600 of any of the compatible examples 1-18, wherein:

the switching element 103, 1604 comprises a curved connector 106, 1650 waveguide configured and dimensioned to guide the electromagnetic wave (having a frequency in a range of 100 gigahertz (GHz) to 1000 terahertz (THz), the curved connector waveguide having an input 118 and an output 120; and the actuator 102, 1602 moves the input 118 and the output 120 along a switching direction 500, α between:

the first position 122, P2 coupling the input 118, port 1 to the first waveguide 104a, 104b, 1608 via the gap 108, 1660 (at the position of the terminal P to the first waveguide) and the output 120, port 2 to the second waveguide via the gap 108 (at the position of the terminal T1 or T2 to the second waveguide), so that the electromagnetic wave is transmitted from the first waveguide to the second waveguide via the connector waveguide, and the second position 124, P1 de-coupling the input from the first waveguide and the output from the second waveguide.

20. The switch of example 19, wherein the connector waveguide 106, 1650 comprises a U-shaped waveguide.

21. The switch of any of the examples 1-20, wherein the waveguides (including the connector waveguides) are configured and dimensioned to waveguide the one or more electromagnetic waves or fields having a frequency f of 250 GHz≤f≤310 GHz, 500 GHz≤f≤750 GHz, or 220 GHz≤f≤600 GHz.

22. The switch of any of the examples, wherein the switching body comprises a piece, element, or member.

23. The switch of any of the examples, wherein the inputs/outputs/terminals of the waveguides are surrounded by or coupled to a metamaterial comprises at least one of:

an electromagnetic bandgap (EBG) surface or structure, or a periodic structure in the first sidewall, the periodic structure comprising at least one of a corrugated surface, or pins/protrusions/structures separated by air gaps, on either side of each of the input and the output of the connector waveguide and/or the waveguides.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A waveguide integrated switch, comprising:
an actuator comprising a switching body coupled to one or more waveguides, the actuator actuating the switching body to open or close transmission of an electromagnetic wave to the one or more waveguides and the one or more waveguides configured and dimensioned to guide the electromagnetic wave having a frequency in a range of 100 gigahertz (GHz) to 1000 terahertz (THz); and
wherein the actuator is configured to position the switching body relative to the waveguides with an accuracy in a range of 1-10 nanometers.

2. The switch of claim 1, further comprising a position measuring device coupled to the switching body, the position measuring device measuring the position of the switching body relative to the one more waveguides with nanometer resolution.

3. The switch of claim 1, wherein the actuator comprises a piezoelectric motor.

4. The switch of claim 2, wherein the position measuring device comprises an optical linear encoder optically coupled to the switching body or a stage of the motor physically attached to the switching body.

5. The switch of claim 2, wherein the actuator comprises a MEMS device including the switching body and the position measuring device comprises a scale or ruler having nanometer scale graduations on the switching body.

6. The switch of claim 2, further comprising a circuit coupled to the actuator, the circuit applying a voltage controlling a position of the switching body using a feedback comprising a measurement of the position relative to a target position obtained using the position measuring device.

7. The switch of claim 6, wherein the circuit comprises a feedback circuit comprising a feedback loop obtaining the measurement.

8. The switch of claim 1, further comprising:
the switching body comprising a metal switching element;
the actuator comprising a piezoelectric motor coupled to the metal switching element;
a circuit coupled to the piezoelectric motor, the piezoelectric motor moving a position of the metal switching element between a first position and a second position in response to one or more voltage signals applied by the circuit to the piezoelectric motor, wherein:
the first position couples the metal switching element to at least one of the waveguides comprising a first waveguide or a second waveguide,
the second position de-couples the metal switching element from the at least one of the first waveguide or the second waveguide; and wherein:
the first waveguide and the second waveguide are configured and dimensioned to guide the electromagnetic wave comprising the frequency in a range of 100 gigahertz (GHz) to 1000 terahertz (THz).

9. The switch of claim 8, further comprising:
a feedback circuit providing feedback to the circuit, the feedback comprising at least one of:
an error in the position, or
the position, comprising a measured position, with respect to a target position.

10. The switch of claim 9, further comprising an optical linear encoder optically coupled to the switching element for measuring the measured position.

11. The switch of claim 8, wherein:
the metal switching element comprises a curved connector waveguide configured and dimensioned to guide the electromagnetic wave, the curved connector waveguide having an input and an output; and
the piezoelectric motor moves the input and the output along a linear direction between:
the first position, coupling the input to the first waveguide via a gap and the output to the second waveguide via the gap, so that the electromagnetic wave is transmitted from the first waveguide to the second waveguide via the curved connector waveguide, and
the second position, de-coupling the input from the first waveguide and the output from the second waveguide.

12. The switch of claim 11, wherein the curved connector waveguide comprises a U-shaped waveguide.

13. The switch of claim 11, further comprising:
a metal waveguide block comprising the first waveguide and the second waveguide, the metal waveguide block having a first metal surface comprising an electromagnetic bandgap surface surrounding a first opening spaced from a second opening along the linear direction, wherein:
the first opening comprises a first input to, or a first output from, the first waveguide; and
the second opening comprises a second input to, or a second output from, the second waveguide;
the metal switching element comprising a metal piece comprising a second metal surface including the input separated from the output along the linear direction;
an electrically insulating spacer spacing the first metal surface from the second metal surface so as to fix the gap, comprising an electrically insulating gap of less than 60 microns between the first metal surface and the second metal surface, at:
the first position, wherein, in a first direction of the gap, the first opening is aligned with the input and the second opening is aligned with the output, and
the second position, wherein, in the first direction, the input is mis-aligned with the first opening and the output is misaligned with the second opening;
alignment pins fixing a third position of the metal switching element relative to the metal waveguide block, the third position in a second direction perpendicular to the linear direction between the first position and the second position; and
fixing pins securing the metal switching element to the piezoelectric motor.

14. The switch of claim 12, wherein the first position and the second position are positionable with 1 nanometer resolution.

15. A device comprising the switch of claim 1, further comprising an antenna and a calibration waveguide coupled to a receiver via the switch, wherein the waveguides comprise a first waveguide and a second waveguide, the calibration waveguide comprises or is coupled to the first waveguide (or the second waveguide), and the antenna is coupled to the second waveguide (or the first waveguide).

16. A transceiver, receiver, transmitter, or spectrometer comprising the switch of claim 1.

17. The switch of claim 1, wherein the waveguides comprise rectangular waveguides having a cross sectional area in a range of 100-5000 microns by 100-5000 microns and the switching body comprises a connector waveguide having a length in a range of 5-10 mm.

18. The switch of claim 1, wherein:
the switching element comprises a curved connector waveguide configured and dimensioned to guide the electromagnetic wave, the curved connector waveguide having an input and an output;
the waveguides comprise a first waveguide and a second waveguide; and
the actuator moves the input and the output along a direction between:
a first position, coupling the input to the first waveguide via a gap and the output to the second waveguide via the gap, so that the electromagnetic wave is transmitted from the first waveguide to the second waveguide via the curved connector waveguide, and
a second position, de-coupling the input from the first waveguide and the output from the second waveguide.

19. The switch of claim 18, wherein the actuator comprises a piezoelectric motor.

20. The switch of claim 18, wherein the curved connector waveguide comprises a U-shaped waveguide.

21. A method of making a waveguide integrated switch, comprising:
coupling a switching body to one or more waveguides using an actuator, the actuator actuating the switching body to open or close transmission of an electromagnetic wave to the one or more waveguides and the one or more waveguides each configured and dimensioned to guide the electromagnetic wave having a frequency in a range of 100 gigahertz (GHz) to 1000 terahertz (THz); and
wherein the actuator is configured to position the switching body relative to the waveguides with an accuracy in a range of 1-10 nanometers.

* * * * *